United States Patent

[11] 3,631,421

[72] Inventor Cornelius C. Perkins
Birmingham, Mich.

[21] Appl. No. 775,971

[22] Filed Sept. 23, 1968

[45] Patented Dec. 28, 1971

[73] Assignee Burroughs Corporation
Detroit, Mich.

[54] DATA STORAGE ADDRESSING SYSTEM
20 Claims, 17 Drawing Figs.

[52] U.S. Cl. .......... 340/174.1 J

[51] Int. Cl. .......... G11b 27/32

[50] Field of Search .......... 340/174.1, 174.1 A, 174.1 C, 174.1 J

[56] References Cited

UNITED STATES PATENTS

| | | | |
|---|---|---|---|
| 3,119,987 | 1/1964 | Slavin | 340/174.1 J |
| 3,167,646 | 1/1965 | Giroux | 340/174.1 J |
| 3,208,057 | 9/1965 | Applequist et al. | 349/174.1 J |
| 2,860,323 | 11/1958 | Burkharr et al. | 340/174.1 |
| 2,901,730 | 8/1959 | Goddard | 340/174.1 |
| 2,932,010 | 4/1960 | Mayer et al. | 340/174.1 |
| 3,195,118 | 7/1965 | St. Clair | 340/174.1 |
| 3,219,999 | 11/1965 | Smith | 340/174.1 |
| 3,337,852 | 8/1967 | Lee et al. | 340/174.1 |
| 3,375,507 | 3/1968 | Gleim et al. | 340/174.1 |

*Primary Examiner*—Terrell W. Fears
*Assistant Examiner*—Vincent P. Canney
*Attorneys*—Kenneth L. Miller and Wallace P. Lamb

ABSTRACT: This invention relates broadly to addressing memory systems for the recording and the retrieval of information therein, and more particularly to a new and improved method of and apparatus for addressing a cyclically movable data storage member, such as a rotatable magnetic disk, capable of locating every bit time thereof and of detecting and correcting any nonsynchronous relation between certain operating and timing signals. The more significant digits of the address of the wanted location are compared against an address track of the memory device in which the more significant digits of the addresses of all of the storage locations are recorded in binary form while at the same time the lesser significant digits of the two addresses are compared by means of a binary counter. With the cooperation of the counter, only the more significant digits of the addresses for the storage locations need be recorded on the address track of the memory device. The counter is capable of locating each digit within any address on the sector track, and as a result, any bit time around the memory may be addressed and located. Moreover, with the cooperation of the counter, certain properties of the binary numbers of the recorded sector track addresses are taken advantage of for synchronizing the operation of the system, and means is provided for detecting any out-of-phase relation between counter and timing signals that might develop and for automatically bringing these signals back into synchronization within a limited distance of movement of the memory device.

INVENTOR.
CORNELIUS C. PERKINS.
BY
Raymond B. Parker
ATTORNEY.

DATA STORAGE ADDRESSING SYSTEM

CROSS-REFERENCES TO RELATED PATENT DOCUMENTS

Reference is made to copending application of Perkins et al. Ser. No. 680,184, filed Nov. 2, 1967 and entitled DATA PROCESSING MACHINE, Now U.S. Pat. No. 3,579,192 and to U.S. Pat. to Gleim et al. No. 3,375,507 granted Mar. 26, 1968, both of which are of common ownership herewith.

BACKGROUND OF THE INVENTION

In cyclical memory storage devices, such as rotatable drums and disks, information in the form of magnetically recorded impulses have been stored in a film of magnetic material coated on the drum or disk surfaces. Each impulse so stored is termed a "bit" of information and large numbers of these bits are continuously recorded in circular tracks on the disk or drum concentric with the axis of rotation thereof. Various schemes have been adopted for locating a portion of one of these tracks for wanted information or for storing information therein. One such scheme included the provision of a clock track on the rotatable member for generating timing signals for signifying the position of the bits in the information tracks and the further provision of an absolute address track for locating each character group of bits on the rotatable memory device. The provision of two distinct timing and address tracks reduced problems in synchronizing the signals of the two tracks with each other and in reducing the access time for locating the desired storage area for either recording data thereon or reading out the content thereof. However, such addressing provisions required the comparison counter to have enough counter stages to provide a unique counter for every bit position around the tracks. As a result, this necessitated considerably more costly equipment for data recording and recovery operations with a consequent greater expenditure of time for accomplishing these operations.

SUMMARY OF THE INVENTION

It is accordingly an important object of the present invention to provide a new and improved method of and apparatus for storing and recovering information which can accomplish the desired addressing operations economically and with reduced equipment and less time.

Another important object of the invention is to provide a new and improved addressing system for cyclically movable data storing members which is capable of locating storage areas on the member by a binary pattern not only uniquely representative of each storage sector but also every "bit" location within each sector.

Another important object of the invention is to provide a new and improved character addressing provision for locating storage areas on a high speed rotatable disk which advantageously blends the absolute addressing and counting techniques in obtaining comparison with the sought after address and which detects and automatically corrects any nonsynchronization which may develop in the use of these two techniques.

A further important object of the invention is to provide a single, reliable and accurate timing system for locating storage areas on a rotatable data storage member and one which will detect a lack of synchronization of signals in the operation of the system and is self-operable to bring the system into synchronization if such lack should occur.

In carrying out the objects of this invention, the present invention contemplates a rotatable storage device, such as a disk, having the data retentive surface thereof divided into a plurality of sectors, each of which in turn may be divided and further subdivided into word and character locations respectively. Placed in concentric relation to the axis of rotation and preferably adjacent to the outer edge of the disk are two cooperating reference tracks, one, a clock track serving as the basic timing reference for the apparatus and generating with the aid of a transducing head a series of electrical pulses preferably equally spaced apart in time, and the other a sector or address track which synchronizes the memory locations on the disk with the machine logic and locates any sector of the disk and any bit position within the sector. The sector track is prerecorded on the disk, preferably for long time usage at the time of its fabrication, and it is linearly divided into a plurality of character containing sectors or locations each having a multibit binary code numerically signifying the address of a particular storage location on the same or similar disk. These address codes preferably progressively differ from one another by unity increments in the direction of the read head scan. The character increments of the sector track are preferably so laid out with respect to the information tracks that each one is read immediately before the recorded material which it identifies on the disk appears at an information read/write head.

A feature of the invention is the provision of a multistage counter for aiding the search for a particular data storage location in the information tracks. This counter provision reduces the amount of circuit components thus augmenting the number of bits in the tracks of the device in order to arrive at a relatively larger total bit count for the disk. In one embodiment of the invention, for example, 16 groups of four character bits are used with a two-bit counter in order to expand the count to 64 available bits for the information tracks on the disk. In another embodiment of the invention 256 groups of eight character bits are employed to count to a total of 2,048 bits around the disk for the information tracks. In this latter embodiment, a three-bit counter is utilized to increase the bit count available in the tracks to the count of 2,048 or $2^{11}$ total number of bits. In the first example, a six bit address register is employed and the associated two-bit counter is arranged to be compared to the two least significant bits in the register while the remaining more significant bits in the register are compared with the addresses on the sector track which are serially read from the prerecorded sector track on the rotating disk. In the second embodiment mentioned above, an eight-bit address register utilized and the three-bit counter associated therewith is compared with the three least significant bits in the register while the remaining five more significant bits in the register are compared with the addresses serially read from the prerecorded track on the rotating disk. The invention is not limited to these two examples, and it will be evident upon a fuller understanding of the invention that it can be adapted to memory devices with smaller and larger number of bits per track.

Another feature of the invention is the provision for synchronizing the operation of the system which is capable of not only recognizing any out-of-phase relation in the timing of certain signals but is also self-operable to correct this improper functioning by bringing the system back into synchronization within a limited distance of rotation of the disk or other storage medium from which the signals are derived. In providing this detection and self-correcting operation, advantage is taken of certain properties of the binary digits in the code groups on the sector track which serve as addresses of storage locations on the disk. A certain property of the digits of the code groups appears at regularly spaced intervals around the sector track, and means is provided for discretely comparing the signals emanating from the binary counter at these regular intervals with certain digits of the binary code groups of the sector track and for noting any lack of synchronization in the timing of these compared signals. Additional means is provided for automatically shifting or precessing the counter signals toward and into synchronization with the sector track signals if such a malfunction should occur and to accomplish this correction within a single rotation of the disk.

BRIEF DESCRIPTION OF THE DRAWINGS

The invention and the aforenoted and other features thereof will be understood more fully and completely from the following detailed description considered with reference to the accompanying drawings wherein.

DETAILED DESCRIPTION OF THE INVENTION

Figure 1:
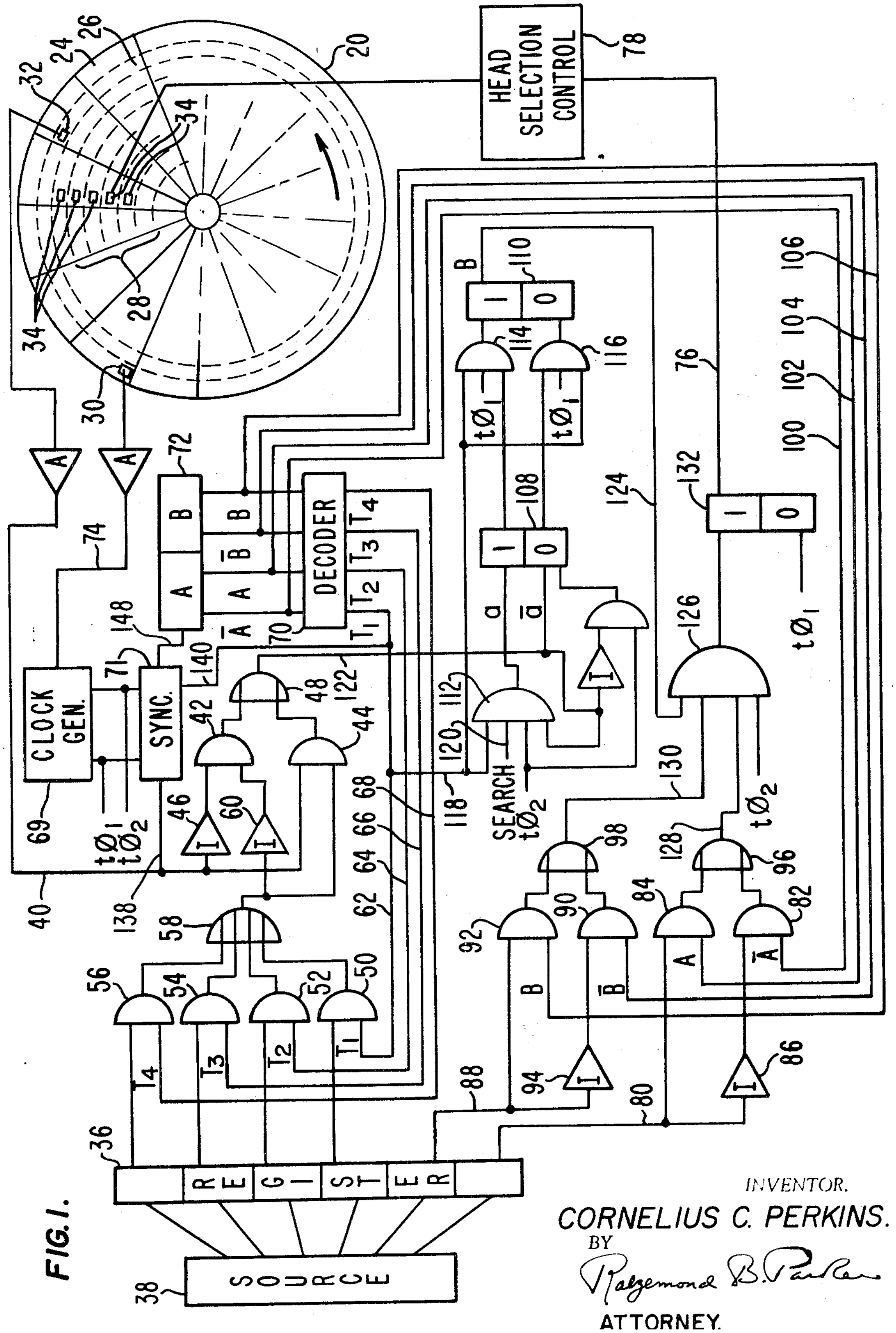
FIG. 1 illustrates representative components, control circuitry and logic of a system for implementing the principles of the invention.

In the embodiments of the invention illustrated herein, the storage medium to be addressed is a rotatable disk. Other cyclically movable members may be used for the storage medium, such as a drum or an endless tape. The disk file employed in the examples presented herein may be coated on one or both sides with a magnetic film in which information may be written or stored and read therefrom by electromagnetic heads. FIG. 1 illustrates a system employing the invention including a disk 20 rotatable about its axis 22 and having a plurality of concentric paths or tracks for containing binary digits which are to be used for timing, addressing and storage of information. One track, such as the outer peripheral track, is a clock track 24 which when scanned as the disk rotates serves as a source of reference pulses. Another track 26 is a sector or address track divided linearly into a plurality of code groups each containing an equal number of digits. The remaining tracks identified at 28 are segmentally divided into storage areas or locations for the entering of information therein in binary digital form and for later retrieval of this information therefrom.

Clock signals are transduced from the timing track 24 by a single read head 30, and address code groups in the information tracks 28 are transduced from the sector track 26 by a single read head 32. As earlier mentioned herein, both tracks are preferably prerecorded, and preferably permanently at the time of fabrication of the disk. As for the information tracks 28, each may have an individual read/write transducer head 34 operatively associated therewith, or heads may be provided which are movable from track to track. The signals in the several tracks may be stored as magnetic bits in a magnetic coating applied to one or both sides of the disk, but it is understood that the invention contemplates the storage of such signals by other expedients, such as by code representations which are stored and/or read optically. When such signals are read by appropriate transducers, as by the aforementioned heads, corresponding electrical pulses are provided on the respective output leads of these transducers.

The prerecorded sector or address track 26 contains the address codes of the disk sectors and every bit time therein. These codes are preferably in binary digital form and arranged on the disk in the same direction of increasing significance of the digits. The disk may be rotated in the direction so that for each address code scanned by the first read head 32, the least significant bit is read first and the significance of the read bits increases in the direction of the scan. Moreover, the address codes are preferably prerecorded on the address track 26 so that they differ from one another by unity increments in the direction of the read head scan. That is to say, the binary digits of the address codes are arranged on the disk so that when the disk is rotated, the codes appear at the transducing head in ascending or descending numerical order, differing numerically from each adjacent code by "one."

The disk 20 may be considered as divided into circularly disposed sectors of equal size as indicated by the radial lines on the disk in FIG. 1. The presently described embodiment of the invention employs a disk of relatively small storage capacity having 64 bit locations completely around the timing track. In a hereinafter described embodiment of the invention, a disk having a timing track of 2,048 bits is disclosed. In the small capacity disk now under consideration, there are 16 sectors each containing four-bit locations in the timing track 24 as well as in the address or sector track 26. In the schematic representation of FIG. 1, it will be assumed that the disk rotates counterclockwise as indicated by the arrow. So rotating, it is to be noted that the sector track read head 32 is located one sector track ahead of the read/write information transducing heads 34. This predisposition of the heads enables the sector track head to read the coded address of a wanted storage location before the latter appears before a selected read/write information head.

When a storage location on the disk is wanted either for writing-in information or for recovering information therefrom, the address of the location is presented to the system. This is accomplished electronically under high speed circumstances by means of a register 36 schematically shown in the left portion of FIG. 1 which temporarily stores the address of the wanted storage location. The source of the wanted address may be a data processing unit of a large computer system, or another data storage system or a remote station seeking to transfer data either into or out of the storage tracks 28 of the disk. Schematically, such a source is shown at 38 with connecting lines extending to the register. In the presently described embodiment of the invention, the register is designed to hold a six-bit address, the illustrated register in FIG. 1 being divided into six locations each serving as a storage location for a digit of the address. The address of the wanted storage location is entered into the register 36 as binary digits in the order of their significance. In FIG. 1, the register is shown vertically disposed and arranged so as to store the least significant digits of the introduced address at the bottom and the most significant digits at the top.

Conventionally, the usual means for addressing a disk memory or other similar form thereof is to have enough counter stages to provide a unique count for each bit position around the timing and sector tracks. One employing a six-bit-type register for storing the address of the wanted storage location would require a provision to count and compare in six-digit binary language. Under such conventional practice, the addresses on the sector track would be successively compared with the address entered into the register and when a six-digit match occurred between the digits of the two addresses, the system would signal the read or write head, as the case may be, for either recovering information from the addressed storage location or for writing information thereinto.

Figure 2:
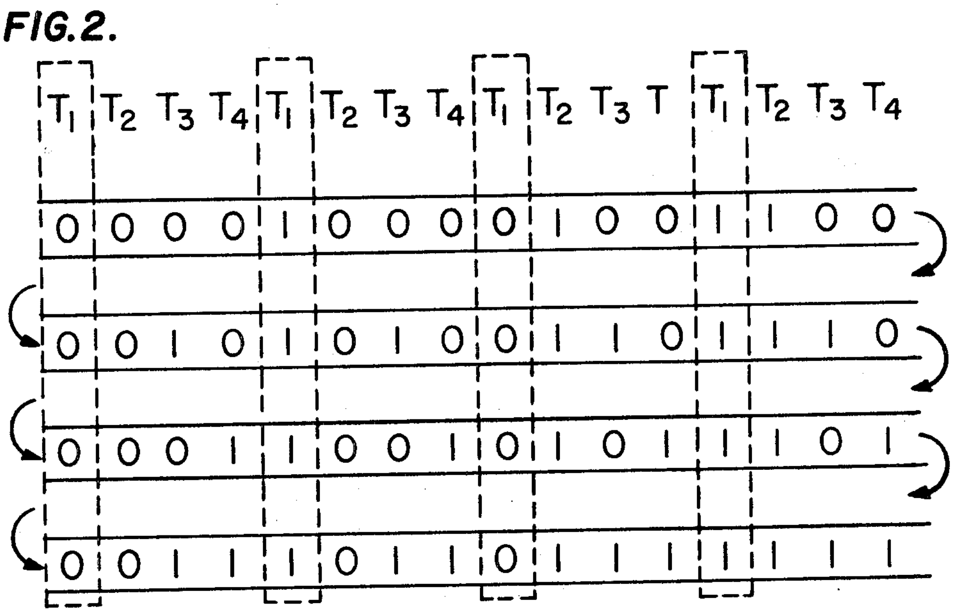
FIG. 2 is an illustrative map of the address codes recorded on the rotatable storage member of the system and indicating certain timing relations between the code groups.

In contrast, the present invention enables the use of fewer binary digits in each address code of the sector track 26 than the address entered into the register 36, for identifying the wanted storage location. In place of a six-bit address on the disk for each storage location in the system, the invention presents a way in which four-bit address codes may be laid down on the sector track linearly in the direction of movement of the disk and yet count every bit position therearound. In such an arrangement, a map of the address codes on the sector track 26 for a 64-bit disk would appear as shown in FIG. 2, reading from left to right, row by row. Each digit represents a bit-time around the disk. There are 64 bits in this representation divided into 16 groups of four binary digits each.

Inspection of the sequence of the four-bit binary numbers in FIG. 2 reveals that they progressively differ from one another in unity increments, proceeding from zero in the upper left corner to binary representation of "15" in the lower right corner. Moreover, the following interesting facts are revealed by this numerical sequence:

4 occurrences of 4 consecutive zeros
3 occurrences of 3 consecutive zeros
4 occurrences of 2 consecutive zeros
8 occurrences of 1 consecutive zero
8 occurrences of 1 consecutive one
4 occurrences of 2 consecutive ones
3 occurrences of 3 consecutive ones
0 occurrences of 4 consecutive ones
0 occurrences of 5 consecutive ones
0 occurrences of 6 consecutive ones
1 occurrences of 7 consecutive ones With the sequence of four-bit numbers recorded on the address track, as shown in the above map, it is possible with the teaching of this invention to identify any bit time around a 64-bit disk. This is accomplished by utilizing a two-stage counter in the present illustrated embodiment of the invention and by comparing the two least significant bits of the six-bit address in the register 36 with the two-bit counter. Moreover, the properties of certain of the numbers in the address sequence can be employed to synchronize the binary counter with the code groups in the address track of the disk as will be pointed out hereinafter. The remaining four most significant bits of the address entered into the register 36 are directly compared serially with the prerecorded four-digit address code groups successively scanned on the sector track 26.

Referring again to FIG. 1, the code groups on the address or sector track 26 are successively scanned, digit by digit, by the head 32 as the disk rotates. The binary digit signals are fed as represented by line 40 to two AND-gates 42 and 44. For one AND GATE, such as that identified at 42, the condition of the signal received thereby is inverted by an inverter indicated at 46. The outputs of the two AND gates are connected to OR-gate 48.

At the same time as each address code is read serially from the disk, the four most significant digits of the address in the register 36 are compared serially therewith. Each location of the four most significant digits in the register is connected to the input of an individual one of four AND-gates 50, 52, and 54 and 56 and impresses a high or low voltage on the input depending upon whether a binary "one" or "zero" is stored in each register location. The separate outputs of the four AND gates are connected to an OR-gate 58, and the output of the latter is connected to the remaining input of the AND-gates 42 and 44 previously described. An inverter 60 is placed in the input lead from OR-gate 58 to AND-gate 42 for the inversion function.

The comparison of the two addresses is accomplished by comparing the appearance of each digit in the address code as it is read from the disk with the digit in the corresponding numerically significant location of the stored address in the register. Since the sector track digits are read in the direction of increasing significance, the four most significant digits stored in the register are similarly read in the direction of increasing significance and compared digit by digit with those scanned from the disk.

Therefore, beginning with the third digit from the bottom of the register 36, the four most significant digits are each individually read at separate times $T_1$, $T_2$, $T_3$ and $T_4$ as indicated by the legends associated with the input leads to the AND-gates 50, 52, 54, and 56 respectively. To obtain the successive comparisons between the digits of the scanned address on the disk and the digits of the address stored in the register, an electrical pulse is applied to the inputs of the AND-gate 50 at time $T_1$, to gate 52 at time $T_2$, to gate 54 at time $T_3$, and to gate 56 at time $T_4$. Such timing pulses are derived basically from the clock track 24 on the disk and are individually conducted to the inputs of the gates 50–56 on separate channels 62, 64, 66 and 68.

The pulse channels 62–68 may be separately pulsed by a decoder 70 which with the aid of drivers (not shown) produces a single pulse on each such channel at their respective times, $T_1$, $T_2$, $T_3$, and $T_4$. The decoder in turn is connected to a two-stage binary counter 72, shown in block form since it may be of conventional design, which functions to count the four digits of each prerecorded address on the disk track 32. The counter utilizes amplified clock pulses received on channel 74 from the timing track head 30 to count the digits of each prerecorded address and transposes these into four signals designated $\overline{A}$, A, $\overline{B}$, and B which are fed to the decoder 70 on separate paths similarly identified. The decoder selects the output channels 62–68 for applying pulses thereto in the time sequence indicated. In a variation of the circuit, the function of the decoder 70 could be achieved by sending the counter signals A, $\overline{A}$, B and $\overline{B}$ to appropriate extra inputs to gates 50, 52, 54 and 56.

In the circuit 74 between the timing track reading head 30 and the counter 72, there is provided in the present embodiment of the invention a clock generator 69 which functions to provide two pulses for every single timing pulse received by it from the disk. The signal received by the generator from the magnetic timing track is a sine wave. Each time the sine wave goes into the positive region, a first square clock pulse, indicated by $t0_1$, is generated, and each time the sine wave enters the negative region a second square wave pulse, indicated by $t0_2$ is produced. Therefore, the clock generator 69 is a source of two sets of pulses identified as phase $t0_1$ and phase $t0_2$ alternating in time with one another. The two sets of phase pulses are delivered on separate output lines identified by their respective designations $t0_1$ and $t0_2$ in FIG. 1. These output lines are branched to deliver the two sets of phase pulses to a synchronizing circuit feature of the invention represented by block 71 in FIG. 1 and hereinafter described and also to deliver to various gate inputs throughout the address comparison circuit of FIG. 1 the respective clock signals $t0_1$ and $t0_2$.

As previously mentioned, the remaining uncompared digits of the address in the register 36, specifically the least two significant digits, are compared against a binary count of the prerecorded address on the disk, such as performed by the two-stage binary counter 72 of FIG. 1. The two least significant digits of the address in the register are in the two lowermost locations thereof as viewed in FIG. 1, and each of these is connected to one of two inputs of a pair of AND gates. As shown in FIG. 1, the least significant digit location in the register is connected by channel 80 to one of the two inputs to AND-gates 82 and 84, one input of which has the inverter 86 for reversing the condition of the signal received from channel 80 for its respective gate. Similarly, the next least significant digit location in the register is connected by channel 88 to one of two inputs to AND-gates 90 and 92, one of which contains an inverter 94 for the inversion function. The common output of each pair of the AND gates is connected to an OR gate, in the case of the lower pair as viewed in FIG. 1 to OR-gate 96 and in the case of the upper pair to OR-gate 98. The remaining inputs of each of the AND-gates 82, 84, 90 and 92 are separately connected by channels 100, 102, 104, and 106 to the output paths A, A, B, and B of the binary counter 72.

The results of the serial comparison of the address stored in the register with the prerecorded address on the sector track 26 are merged or incorporated with the results of the comparison of the two least significant digits of the address in the register with the count performed by the binary counter 72. In so doing, the counter counts the locations of the four prerecorded digits of each address and in this manner it provides a facility for locating any bit position within each address and any timing bit around the disk provided by the clock track 24. If a complete match occurs between the two compared addresses, a signal will occur on the output line 76 leading to the read/write head selection control circuit exemplified by the block 78. The control circuit in block 78 may be of conventional design and functions to determine which information transducing head 34 will be activated and whether a read or a write operation will be performed thereby.

In merging the two comparison operations performed by the system of FIG. 1, the result of the direction comparison of the four most significant digits of the two addresses at AND-gates 42 and 44 is fed through OR-gate 48 to a subcircuit composed of two flip-flops 108 and 110 and three AND-gates 112, 114, and 116 which function in an accumulative fashion to determine whether exact identity of the four most significant digits of the two compared addresses occurs digit by digit at times $T_1$, $T_2$, $T_3$, and $T_4$. The subcircuit provides a signal at its output line only if complete correspondence occurs between the four most significant digits of the two addresses being compared.

At time $T_1$ when the first of the four most significant digits in the two addresses are compared, a timing signal $T_1$ is sent over channel 118 and through branching divisions thereof to the three AND-gates 112, 114, and 116. This signal, which may approximate in duration one of the original signals received over channels 74 from the timing track, is passed through AND-gate 112 to flip-flop 108 upon coincidence of signal $t0_2$ derived from the clock generator 69 and the presence of a search signifying voltage level on search line 120. This last search signal is received from a source in the computer initiating a search to be made by the address circuit for a specific storage location on the disk file for entry therein-to or retrieval of information therefrom. Also at time $T_1$, a signal will be sent over channel 122 from the OR-gate 48 to flip-flop 108 if a match occurs between the first digit in each of the two compared addresses. The receipt of the timing signal $T_1$ by the flip-flop 108 will cause it to change from its initial reset condition to set condition, but only upon receipt of a signal on channel 122 signifying identity of the first of the four most significant digits being compared in the two addresses. If these first compared digits at time $T_1$ do not agree, then the absence of a signal on line 122 will prevent the flip-flop 108 from changing from reset to set condition. Failing to set at time $T_1$, this flip-flop will be prevented from setting at any other times $T_2$, $T_3$, or $T_4$, even though one or more exact comparisons of the digits occurs at these later times. In other words, it might be said that the subcircuit recognizes that if no exact comparison of the first digits occurs at $T_1$it will be futile to sample the remaining three digits because no complete agreement can be reached between the two addresses being compared.

If at time $T_1$, a signal is delivered on line 122 to flip-flop 108 signifying a match of the first compared digits, the flip-flop will take a set condition. If subsequent agreement occurs between the second digits of the two addresses being compared at time $T_2$, flip-flop 108 will continue to remain in set condition. The same applies if such correspondence occurs when the last two digits in the two addresses are compared. When complete match of the four most significant digits in the two addresses occurs, flip-flop 110 at the end of the subcircuit will have remained in a set condition to provide a signal on its output line 124. This line extends to and forms one of four inputs to AND-gate 126. The remaining inputs to AND-gate 126 comprise the separate outputs 128 and 130 of OR-gates 96 and 98 respectively employed in comparing the two least significant digits.

It may be in order at this time to describe how the two-stage binary counter 72 functions to compare the least two significant digits in the address presented to the register 36. In the normal properly synchronized operation of the system, the two flip-flops of the binary counter are in the "zero" state as the leading edge of each sector on the disk containing a coded address reaches the sector track read head 32. At this instant, the zero-side outputs of the counter are at "high" level. At the first received timing pulse following this condition, which signifies a count of one, the first of the two flip-flops in the counter 72 is triggered from the "zero" state to the "one" state, and the "one-side" output of this flip-flop becomes "-high." The binary value in the counter is now –10–. On application of the second pulse to the counter, its first flip-flop a gain changes state and the "zero-side" output pulse is "high." This change in state will apply a pulse to the input of the second flip-flop, causing it to change to the "one" state and the "one-side" output of this flip-flop becomes "high." As a result of the changes of state of the two flip-flops, the binary count is now –01–. The third timing pulse received by the counter changes its first flip-flop to the "one" state with the result that the binary count on reset of the third timing pulse is now –11– and both "one-side" outputs are "high." On receipt of the fourth timing pulse, it will cause both flip-flops to assume the –00– binary configuration, which is the count that was present at the beginning of the counting operation. At this point the next address sector on the disk is arriving at the read head 32, and the flip-flops in the counter are both in the "-zero" state preparatory to counting the digits in the arriving address code similarly to that described.

It should be apparent from the above description of the counter's action that as the counter 72 performs its designed functions, the changing states of its flip-flops are conveyed by channels 100, 102, 104 and 106 to the AND-gates 82, 84, 90, and 92 for comparison with the binary numbers stored in the first two of the six locations in the register 36. Assuming proper synchronization of the counter with the address track, the first pulse received by the counter at the beginning of the reading of a sector will find the two flip-flops in the counter in "zero" condition. Upon receipt of this pulse at time $T_1$, and the remaining pulses at times $T_2$, $T_3$ and $T_4$, the flip-flops within the counter will present to the AND-gates 82, 84, 90 and 92 their respective high or low levels in the following manner:

at time $T_1$–$\overline{AB}$ or "OO,"
at time $T_2$–$A\bar{B}$ or "10,"
at time $T_3$–$\bar{A}B$ or "01," and
at time $T_4$–AB or "11."

Assuming a binary zero in each of the first and second address locations in the register 36, their value, represented as "low," would appear on channels 80 and 88 and be applied respectively to gate 84 as a "low," and by virtue of inversion to gate 82 as a "high," and to gate 92 as a "low" and to gate 90 in inverted form as a "high." At time $T_1$ the "high" signals from the counter 72 represented in this instance by $\overline{AB}$ are applied along channels 100 and 104 to the corresponding $\bar{A}$ and $\bar{B}$ inputs of the gates 82 and 90. The inputs to the remaining two gates 84 and 92 will be at the "low" level. Thus, there will appear a coincidence of "highs" and "lows" on all the inputs to the AND-gates 82, 84, 90, and 92 which would condition these gates to pass their respective "high" signals through the OR-gates 96 and 98 and their respective output lines 128 and 130 to the three-input AND-gate 126. The terminal end of channel 124 serves as an input to gate 126 and if a signal exists on this channel signifying a complete match between the four most significant digits of the two addresses being compared, then the AND-gate 126 will be enabled and change the state of flip-flop 132 in the output line 76 leading to the head selection control circuit represented by the block 78. The signal passed by channel 76 will cause the head selection circuit to immediately activate the selected head 34 for e either reading from or writing into the storage location of its associated track which is presented to the activated head at this time.

Taking another example, if the two least significant digits of the sought after address appearing in the register are represented by binary "ones" their respective "high" level values will appear on channels 80 and 88 for application to one input of each of AND-gates 84 and 92, and their respective "low" values would appear at inputs to companion gates 82 and 90. At pulse time $T_2$, the "high" signals from the counter as represented by $A\bar{B}$ are conveyed along channels 102 and 104 to the gates 84 and 90, and the "low" signals along channels 100 and 106 to gates 82 and 92. It is evident that because the "hgih" signal levels from the register are applied to gates 84 and 92 a mismatch will occur at time $T_2$. In this instance there would be no coincidence of either "highs" or "lows" at gates 90 and 92 and, therefore, no signal from this pair of gates would appear on channel 130 for AND-gate 126. A similar situation will occur at time $t_3$. The "high" signals from the counter, represented by $\bar{A}B$, will be applied by channels 100 and 106 to one input of each of gates 82 and 92, and the "lows" by channels 102 and 104 to gates 84 and 90. In this circumstance, no coincidence of like signals will occur at AND-gates 82 and 84 and as a result at time $T_3$ no signal will appear on path 128 to AND-gate 126.

However, at time $T_4$, the signals from the counter represented by AB will apply "high" signals on channels 102 and 106 to AND-gates 84 and 92 and "low" signals on channels 100 and 104 to AND-gates 82 and 90. In doing so, the applied signals from the counter will find coincidence at these gates with like signals from the register 36 enabling both pairs of gates to send signals on paths 128 and 130 to AND-gate 126. It is apparent in this example that at each time $T_4$ signals will appear on channels 128 and 130 to AND-gate 126 signifying that binary "ones" are present in the two least significant digit locations in the register 36. However, no signal on channel 76 activating the selected information transducing head will occur until AND-gate 126 receives a signal on channel 124 indicating a complete match has occurred between the four most significant digits of the sought after address in the register and one of the coded addresses in track 26. In the presently described embodiment of the invention, where only 16 sectors are on the disk, one of the prerecorded code groups in these sectors will find corresponding identity with the four most significant digits of the six-bit address stored in register 36. At the time of the transit of this code group past the reading head 32 a complete matching of the most and least significant digit positions of the two compared addresses will occur; and at the conclusion of this transit, the comparing circuits will be operative to produce an output and condition AND-gate 12 to apply a signal to flip-flop 132. The setting of this flip-flop will provide an activating signal on channel 76 to the head selection control circuit 78.

Figures 3A, 3B:
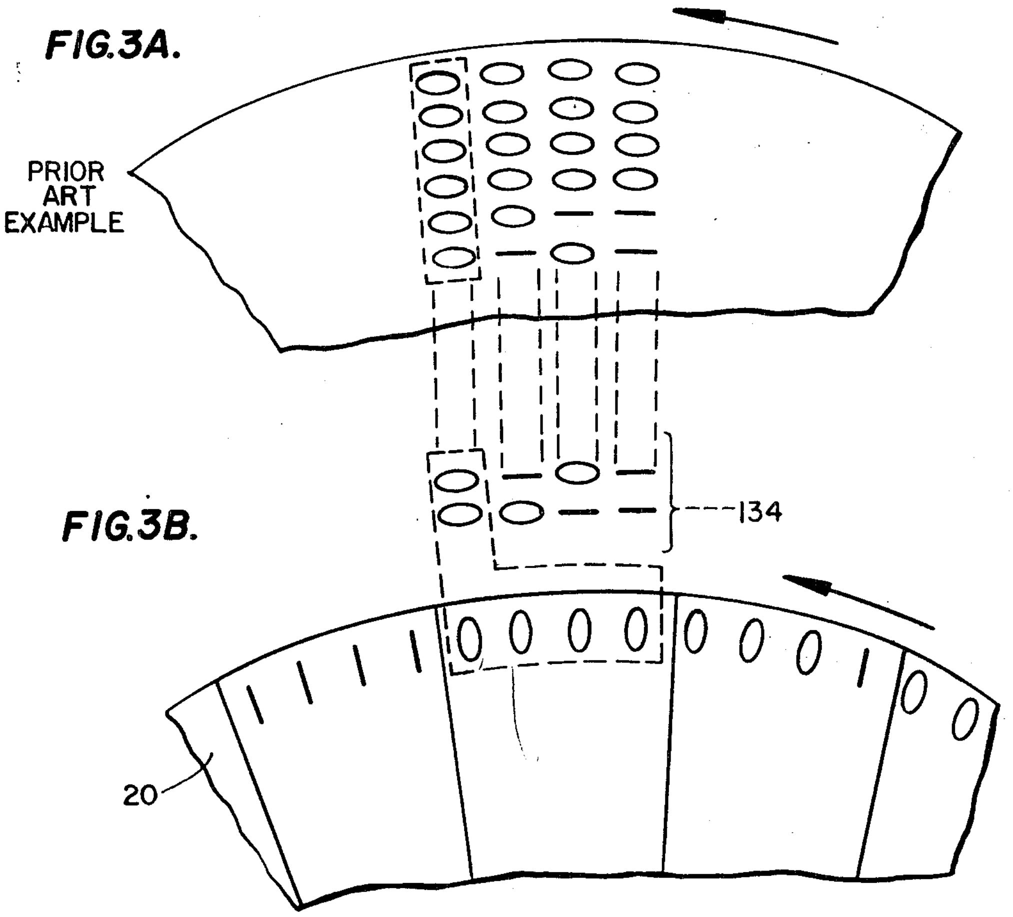
FIGS. 3A and 3B are schematic illustrations of fragmentary portions of a disk file and showing in FIG. 3A how the addressing of the disk might be accomplished according to conventional practice, and showing in FIG. 3B, by comparison, how the combined counting and recorded address techniques are utilized in practicing the present invention.

A reference to FIGS. 3A and 3B may be helpful in understanding the presently described hybrid combination of the binary counting technique and the absolute comparison technique for addressing a cyclically movable data storage medium. FIG. 3A illustrates on a fragmentary portion of a memory disk 20 one way in which conventional practice might consider laying down the address code groups on the disk to achieve the capability of locating each bit position therearound. This figure is to be compared with FIG. 3B which displays a similar portion of the disk but modified in accordance with this invention to show several address code groups of four digits each laid down seriatim on the disk's periphery and in the direction of movement thereof. Each binary code group of FIG. 3B differs from its immediate neighbor by unity increments of "one," and each such prerecorded code group of four digits represents the four most significant digits of a six-bit address. The remaining two bits of each such address, representing the least significant digits thereof, are shown in phantom position at 134 beyond the edge of the disk in FIG. 3B. The two-stage binary counter 72 counts the four digits of each prerecorded address in the sector track as the disk rotates past the head 32, and as the counting occurs in binary form the counter 72 applies the resulting "high" and "low" signals on channels 100 to 106 at the successive time periods of $T_1$ to $T_4$. This method of addressing enables a small two-stage binary counter to be used in conjunction with the absolute address recovery technique and thus avoids a costly recording and reading of a six-bit address at every bit position around the disk, as exemplified in FIG. 3A, or the provision of a counter having enough counting stages in order to provide a unique count for each bit position around the address track.

Figure 4:
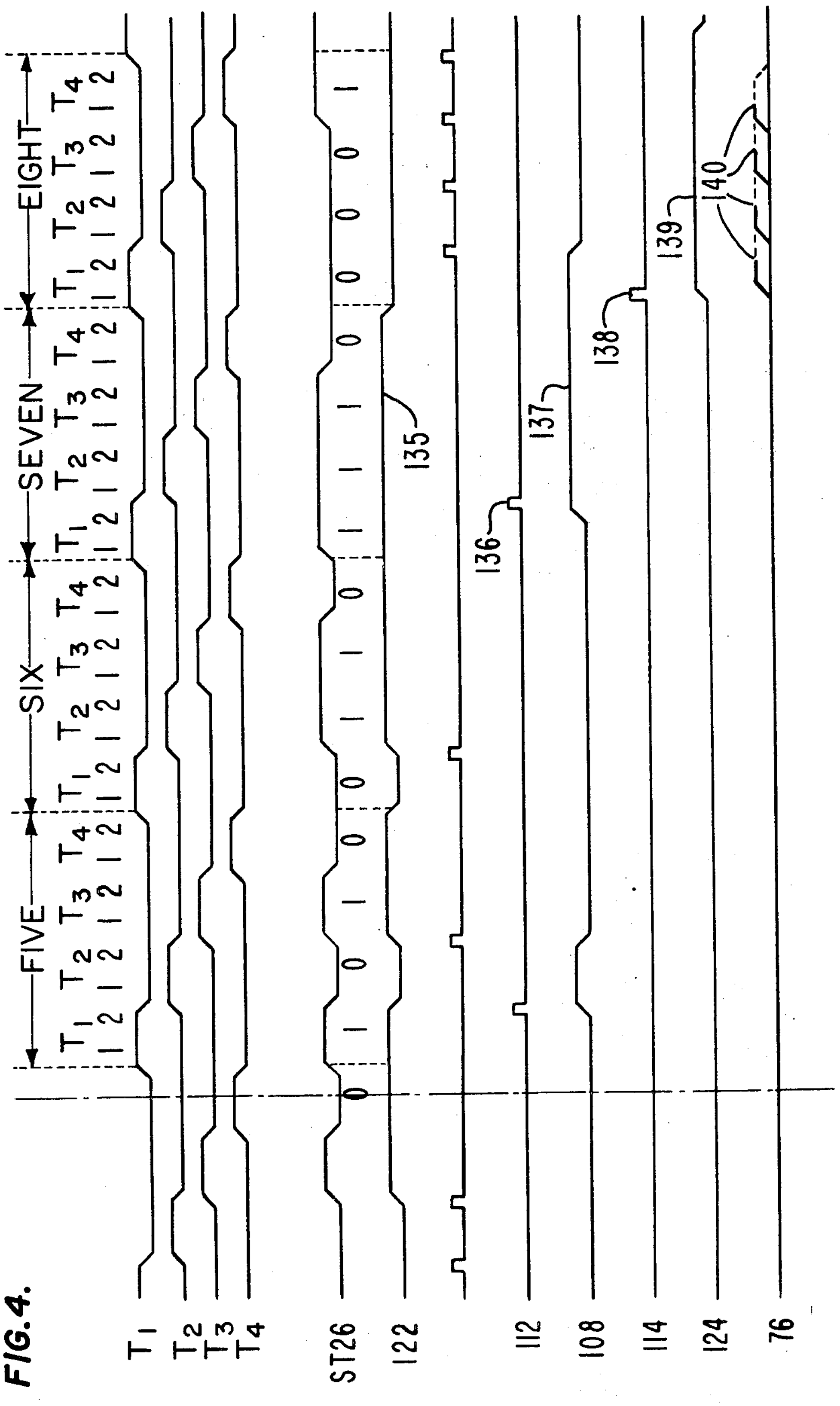
FIG. 4 is a pulse waveform chart illustrating by way of an example how signals form the code groups on the address track and from the binary counter are compared with the most and least significant digits of the sought after address.

The pulse waveform chart of FIG. 4 may also be helpful in understanding this hybrid method of addressing a cyclically movable data storage device. FIG. 4 shows, by way of an example, the comparison of the signals derived from the reading of four successive address code groups of the prerecorded sector track 26 against the four most significant digits of a sought after six-bit address in the register 36. The chart of FIG. 4 also shows the waveforms resulting when a match occurs between one of the address codes on track 26 and the address stored in the register. Lastly, the chart further shows the signals which would result from a comparison count of the two least significant digits stored in the register and how such signals would signify the addressed bit position within the sector of the disk represented by the address code. For the illustrated example, it is assumed that "SEVEN" is stored in the six digit locations of the register 36. In the chart of FIG. 4, the vertical column headings, "FIVE," "SIX," "SEVEN," and "EIGHT," represent the time periods covering the readings of the binary codes for these numbers from the sector track 26. Subheadings for each of these columns indicate the time periods $T_1$, $T_2$, $T_3$, and $T_4$ and their respective phases $t0_1$ and $t0_2$ identified in the chart as "1" and "2."

In the chart of FIG. 4, the waveforms for the timing signals $T_1$ to $T_4$ are shown in overlying relation to the vertical columns representing the time periods covering the successive readings of the address code group FIVE to EIGHT recorded in the sector track 26. The signals derived from these particular code groups appear in the row designated ST 26 of the chart and are accompanied by their binary codal representations "0" and "1." The waveform 122 on the chart illustrates the signals conveyed on the correspondingly numbered channel 122 of the system shown in FIG. 1 resulting from a comparison performed by AND-gates 50 to 56 of the signals of the four address codes read from the sector track against the four most significant digits of the SEVEN stored in the register 36. It is evident from this waveform that during the readings of the digits of the addresses FIVE and SIX no complete match occurs with the most significant digits of the SEVEN stored in the register.

However, during the reading of the SEVEN code group from the sector track, its digits completely match those of the SEVEN in the register with the result that a continuous signal 135 occurs on channel 122 during the four time periods $T_1$ to $T_4$ of the SEVEN. At phase $t0_2$ of Time $T_1$ in the reading of the SEVEN from the sector track, a favorable signal 136 is received by the flip-flop 108 from AND-gate 112 signifying a match of the first digit of the two addresses. The receipt of this signal, which appears on waveform 112 of the chart in the second phase $t0_2$ of time period $T_1$ of the SEVEN column, sets the flip-flop 108; and because of the continuous matching of the remaining three digits of the compared addresses, the flip-flop remains set throughout the remainder of the time represented by column SEVEN and the first time period of column EIGHT, as indicated at 137 in waveform 108 signifying the output of the flip-flop 108.

The presence of a signal from the output of the flip-flop 108 at first phase $t0_1$ of time period $T_1$, which occurs at the beginning of the reading of the next address of the sector track, causes the AND-gate 114 to be enabled and its output signal 138 sets flip-flop 110 to provide an uninterrupted signal 139 of four digits length on channel 124, which is shown in the corresponding numbered waveform in the chart of FIG. 4. This last signal on channel 124 signifies a complete match of code group SEVEN of the sector track with the four most significant digits of the address entered in register 36, and it is applied to AND-gate 126 throughout the reading of the next successive address code, EIGHT, on the sector track. It was previously pointed out herein that in this disclosed embodiment of the invention the reading of each address in the sector track precedes by one sector the transit by the read/write heads 34 of the storage location on the disk to which the address refers.

Throughout the reading of each address code in track 26, the binary counter 72 counts each bit position. Accordingly, during the presence of the uninterrupted signal on channel 124 representing a match of SEVEN's in the present example, but occurring during the reading of the next or EIGHT address code, the counter compares the two least significant digits in the manner previously described herein. At the instant the binary count of the counter 72 agrees with the binary value of the two least significant digits of the address in the register 26, concurrent signals will appear on channels 128 and 130 and be applied to AND-gate 126. This will occur in whichever one of the four time periods $T_1$ to $T_4$ the four AND-gates 82, 84, 90 and 92 are simultaneously enabled indicating a match of the least significant digits. Upon coincident receipt of the signals on channels 124, 128, and 130 with the timing pulse at phase $to_2$, AND-gate 126 is satisfied and sets flip-flop 132 with the result that a pulse signal will appear in one of the four time periods $T_1$ to $T_4$ on channel 76 representing the wanted storage bit position within the addressed sector of the disk file now passing under the read/write heads 34. The pulse on channel 76 will be any one of the four partially formed pulses 140 shown on waveform 76 in the chart of FIG. 4. This pulse will be conveyed to the head selection control circuit 78 to activate the selected data transfer head 34 at the precise instant the addressed bit appears thereunder.

Figure 5A:
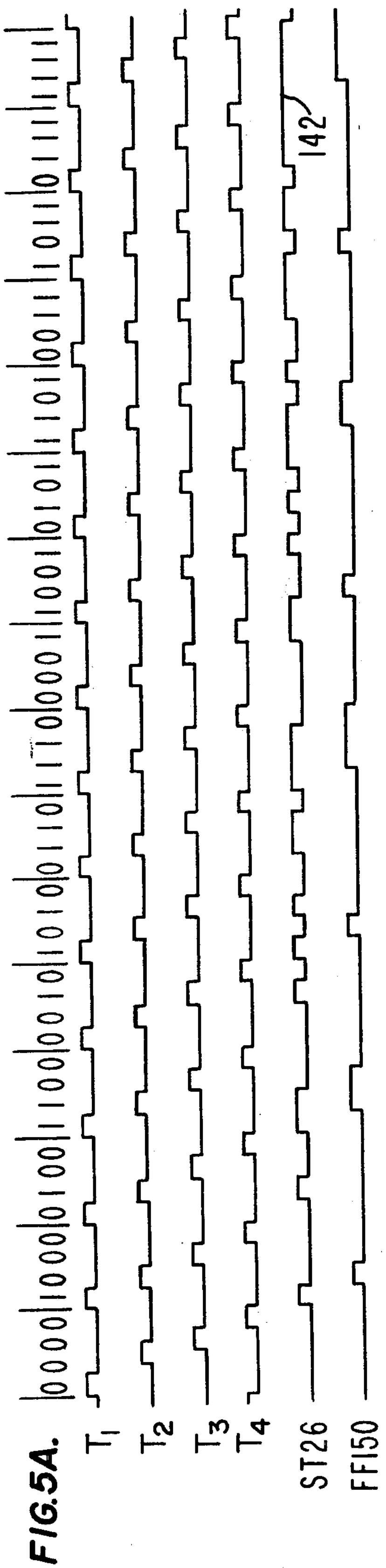
FIG. 5A, 5B, and 5C are timing diagrams useful in promoting a fuller understanding of the operation of the system, FIGS. 5A and 5B illustrating normal operating conditions and FIG. 5C illustrating the occurrence of a lack of synchronization and the correction thereof.

The timing diagrams of FIGS. 5A, B, and C will be helpful in understanding the timing relation of the various signals occurring throughout the operation of the system and how the binary counter 72 can be brought into synchronization with the sector track signals in the event an out-of-phase relationship should arise therebetween. All three Figures show the signals occurring in the system during one rotation of the 64-bit disk 20 of the presently described embodiment of the invention. The top row of FIG. 5A displays the 16 groups of four character bits, each of which are prerecorded on the sector track 26 in the order shown. This row corresponds with the map of the binary digits appearing in FIG. 2. The next four rows show the offset relation of the timing pulses $T_1$, $T_2$, $T_3$, and $T_4$ to one another and their respective relations to the bit positions to which they are assigned in each address sector of the disk. The next row of FIG. 5A shows the signals generated by the prerecorded code group track 26 in response to the changes in the binary states recorded therein and sensed by the reading head 32. It will be noted that the frequency of the binary "ones" in the address code track 26 are reflected in the waveform reproduction thereof, and that at the conclusion of the track the sequence of seven "ones" generates an elongated pulse 142 spreading substantially for the time periods of the last two sectors of the track immediately preceding the zero bit position in the track. The last row of FIG. 5A and the remaining FIGS. 5B and C will have more significant meaning in connection with the synchronization feature of the system and will be referred to in more detail hereinafter.

Earlier mentioned herein is the synchronizing circuit 71 operatively located in the system between the clock generator 69 and the binary counter 72. The purpose of this circuit is to assure that the counter is in proper phase with the recorded information on the sector track 26. Not only does this synchronizing provision detect any lack of time coincidence between the operation of the binary counter and the sensed addresses on the sector track, but it is also self-operable to correct any such error and bring these two components of the system into synchronization within a limited distance of rotation of the disk 20.

First, with general reference to FIG. 1, it is evident that the synchronizing circuit 71 receives timing signals from the clock generator derived from track 24 and by way of branching lead 138 serially receives signals representing the digits of the addresses recorded on the sector track 26. Also, a feedback line 140 extends from channel 62 along which signals at time $T_1$ are conveyed to the synchronizing circuit 71. As alluded to earlier herein, certain properties of the sequence of binary numbers representing address locations on the disk are utilized for synchronizing the counter with the address code groups on the sector track 126. One such property of the binary number sequence herein previously mentioned is the presence of a single occurrence of seven consecutive "ones" in the sequence. Another property is the alternate succession of binary "zeros" and "ones" for the first digit of each code group in the address track. Advantage is taken of these properties to detect any lack of synchronization of the binary counter's operation with respect to the address code track and when such lack is detected to self-correct such error by returning the counter to synchronized relation with the readings of the address track.

Figure 6:
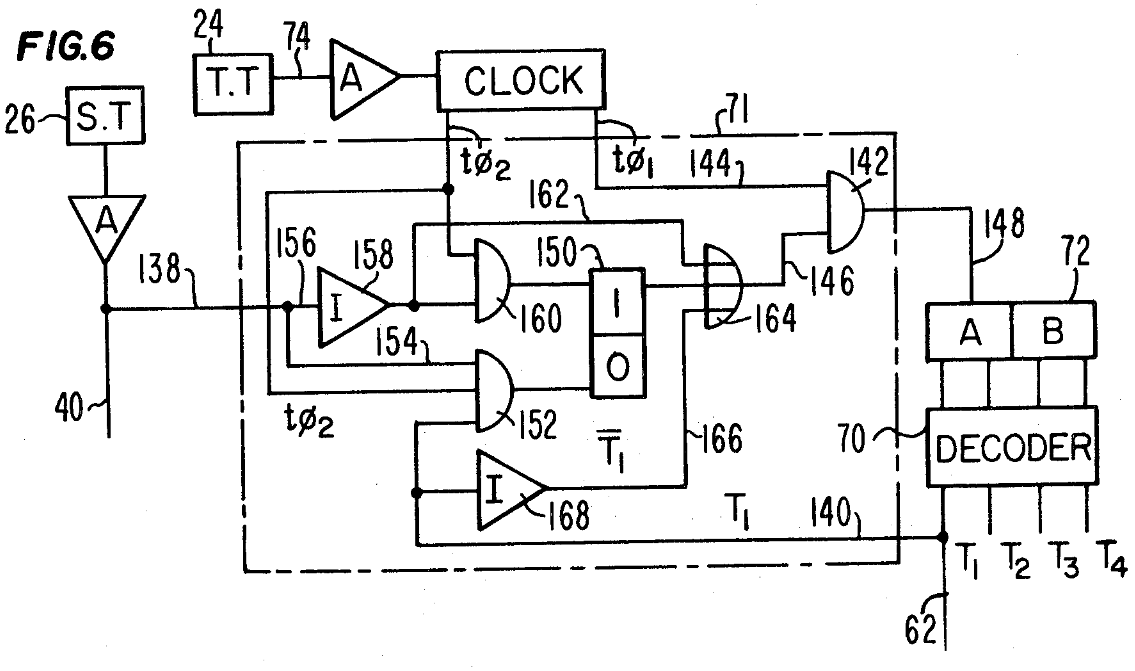
FIG. 6 illustrates one form of synchronizing circuit for detecting any out-of-phase relation between the binary counter's operation and the reading of the address track.

Referring more specifically to FIG. 6, the synchronizing circuit 71 is shown enclosed in a dotted outline and includes an AND-gate 142 at the output end thereof which upon coincident receipt of timing track pulses and sector track pulses on channels 144 and 146 respectively will gate pulses on its output line 148 to the binary counter 72. The pulses received by the counter are transposed by the decoder 70 in the manner previously described to provide pulses on separate output lines at times $T_1$, $T_2$, $T_3$, and $T_4$. It will be remembered from earlier description herein that these enumerated time intervals are designed to coincide with the respective transits of the first, second, third, and fourth digits in each address code group by the sector track reading head 32. At proper in-phase operation of the system, the passage of the first digit in each address code by the reading head 32 will occur at time interval $T_1$. As previously pointed out, a property of the code sequence of which advantage is taken is the presence of one sequence of seven consecutive "ones" with none of four, five or six "ones."

A flip-flop 150 is provided in the synchronizing circuit and for clarity its two states are indicated in FIG. 6 at "1" and at "0." In this instance, the flip-flop is a trailing edge type. If the flip-flop is activated at each time interval $T_1$, and if the counter and sector track are in synchronization, the flip-flop will switch states at each regularly spaced time interval $T_1$, in this instance resetting at every other time $T_1$ and setting at any time a "zero" appears on the sector track before the head 32.

In order to provide the desired timing control, the output of the decoder 70 at time $T_1$ is connected to the synchronizing circuit by path 140 as previously briefly mentioned in connection with FIG. 1. Each pulse on path 140 is fed to an input of an AND-gate 152 which receives on a second input phase pulses at $t0_2$ and on a third input 154 all of the signals of the binary digits in the code groups recorded on the sector track. It is evident at phase $t0_2$ of time interval $T_1$, and assuming synchronization, that only the first digit of each address code group will be applied to open the gate 152 to the "one-input" side of the flip-flop 150.

On a parallel path 156 all of the signals of the code group digits on the sector track are also conducted to the "zero-input" side of the flip-flop 150. En route, the signals on path 156 are oppositely conditioned by the inverter 158 and satisfy AND-gate 160 in coincidence with the timing phase pulses $t0_2$. A branch path 162 bypasses the coded address digits around the flip-flop 150. An OR-gate 164 has three inputs and as its output the path 146 leading to the AND-gate 142 as previously described. One of the inputs is the bypass line 162, another is connected to the output of the flip-flop 150, and the third is connected to path 166 which by virtue of inverter 168 receives the now oppositely conditioned timing pulses $T_1$. If any one of such signals on the inputs of the OR-gate 164 is high or true, then an output pulse will appear on path 146 to the AND-gate 142; otherwise, if all inputs to the OR gate are not true, then its output will not be true. When the system is in proper synchronization, at least one input to OR-gate 164 will be true and a signal will appear on the output 148 of AND-gate 142. When coincidence is made with the timing phase pulses $t0_1$ conveyed to the gate on path 144, counting by the binary counter 72 will continue so long as these output signals are received thereby.

Figure 5B:
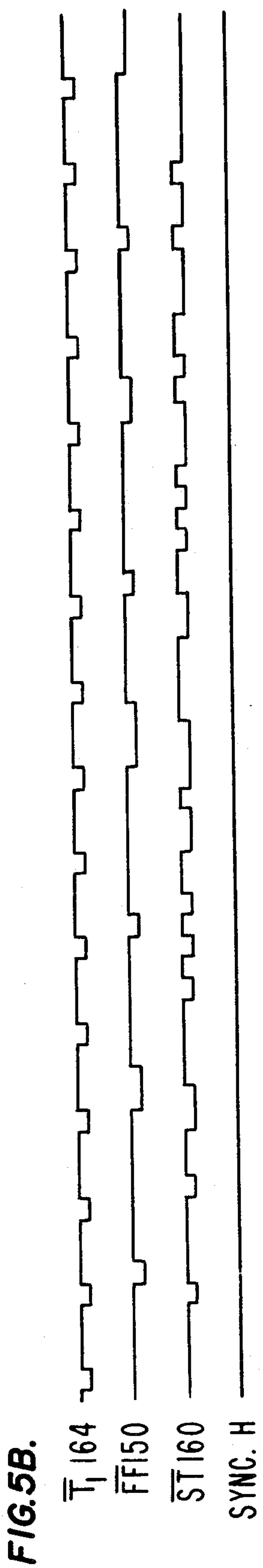

Referring again to FIG. 5A, the pulse waveform FF 150 indicates the setting and resetting periods of the operation of flip-flops 150 in the synchronization circuit throughout one revolution of the disk, and it is to be noted that it resets in time coincidence with the appearance of a binary "one" in the sector track at time $T_1$ and sets after the appearance of a "zero" in this track. If the binary counter 72 is properly synchronized with the reading from the sector track 26, the flip-flop 150 will reset at the beginning of the alternate sectors of the disk having a binary "one" as the first digit and shortly set thereafter as the result of the appearance of a binary "zero" in the sector track before the next code group in the sector track is read. The first three rows of FIG. 5B illustrate the pulse waveforms at the respective inputs to OR-gate 164. It is evident from an inspection of these waveforms that when the system is in proper synchronization at least one input to gate 164 is high or true thereby assuring operation of the counter 72. A "sync" signal for this condition is represented by a continuous straight line for the duration of one revolution of the disk as illustrated by the fourth waveform in FIG. 5B. It may be derived from the circuit by tapping the output 146 of OR-gate 164.

Figure 5C:
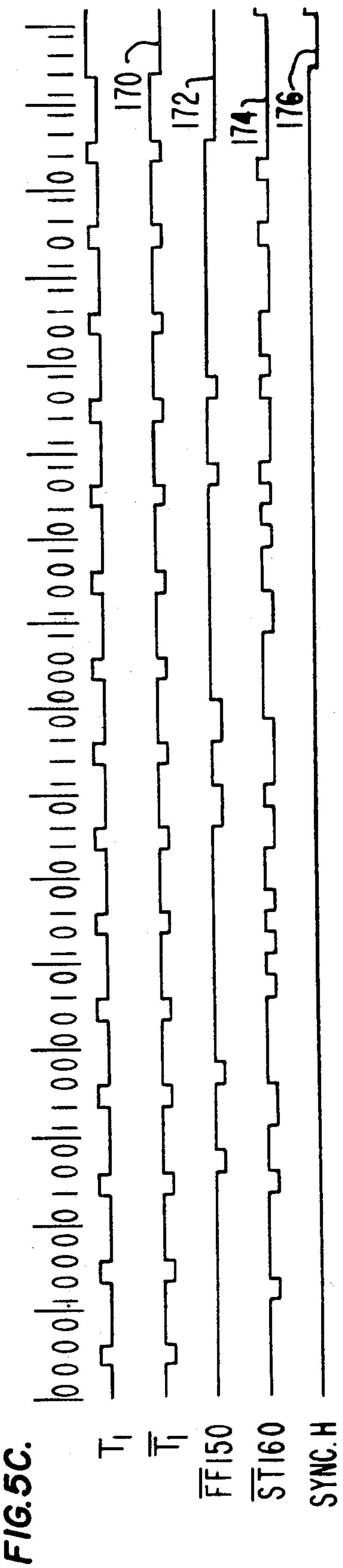

An example of nonsynchronization is illustrated in FIG. 5C. The time periods represented by the pulse diagram $T_1$ are all displaced one time period to the right as indicated by comparison of this diagram with the corresponding one in FIG. 5A. This means that as early as the zero sector of the address track in the counter 72 was out of phase with the recordings in the address track by commencing the count of the digits in each address code pattern with the second rather than the first digit therein. The inversion of these time periods is shown in the second row designated $\overline{T_1}$ of FIG. 5C. The operation of flip-flop 150 in this out-of-phase relationship is shown by the pulse line $\overline{FF}$ 150. It will be noted by comparison with the similarly designated pulse line in FIG. 5B that in nonsynchronized operation the flip-flop is activated to reset condition at time intervals $T_2$ when a "one" appears in the sector track 26. The inverted sector track input to AND-gate 160 is also shown in fIG. 5C and corresponds to that illustrated at $\overline{ST}$ 160 in FIG. 5B.

In the operation of the synchronizing circuit of FIG. 6, if the counter 72 is not in synchronism with the reading of the address track 26, it will be corrected during the reading of the seven consecutive "ones" appearing in the last two code patterns of the track. More specifically, for the example illustrated by the pulse diagrams of FIG. 5C, the correction will take place during the reading of the last three bits of the seven consecutive "ones" in the address track. With specific reference to FIG. 5C, it will be evident that when the inverted condition of the timing signal $T_1$ being applied to OR-gate 164 turns negative near the conclusion of the run of seven consecutive "ones," as indicated at 170, it will find the remaining two inputs to the OR-gate 164 also in negative state, as shown at 172 and 174. The operating logic of the synchronizing circuit 71, as previously pointed out, is that if all the inputs to the OR gate are not high or true, then no output will appear therefrom. Failing to produce an output, no pulse will appear on the output 148 of AND-gate 142 leading to the counter 72 and the latter will cease functioning until the delivery of pulses from gate 142 are resumed. In other words, the counting operation of the binary counter 72 will be inhibited until it gets a true signal signifying that it is now in proper synchronism with the reading of the address track 26. The last line of FIG. 5C, designated "sync," indicates the correction period at 176 during which the counter is inhibited.

In the illustrated example of FIG. 5C, the counter is inhibited from operating for three bits and then upon the sensing of the "zero" of the next code pattern in the address track the flip-flop 150 will switch to a set state producing a true signal for the OR-gate 164. The counter will then immediately resume operation and start counting the first digit of each code pattern at time $T_1$, thereby bringing the counter into synchronism with the reading of the address track. This same form of automatic correction will apply if the counter starts its count of each code address on the third and fourth digit thereof. In these last mentioned nonsynchronous conditions, the counter will be inhibited for two bits and one bit respectively in order to bring it back into synchronization.

It is evident from the description of the operation of the synchronizing circuit of FIG. 6 that it will detect a lack of synchronization and bring the system back into the synchronism in the last portion of the address track 26. Although a full revolution of the disk occurred in the illustrated example of FIG. 5C before self-correction was achieved, it is obvious that regardless of when nonsynchronized operation commenced it would be corrected at the end of the address track. In other words, a full revolution of the disk represents the maximum time for the circuit of FIG. 6 to reestablish synchronization. It could correct this condition in proportionately shorter time depending on how far in advance of the seven "ones" of the address track the nonsynchronized operation commenced.

Figure 7:
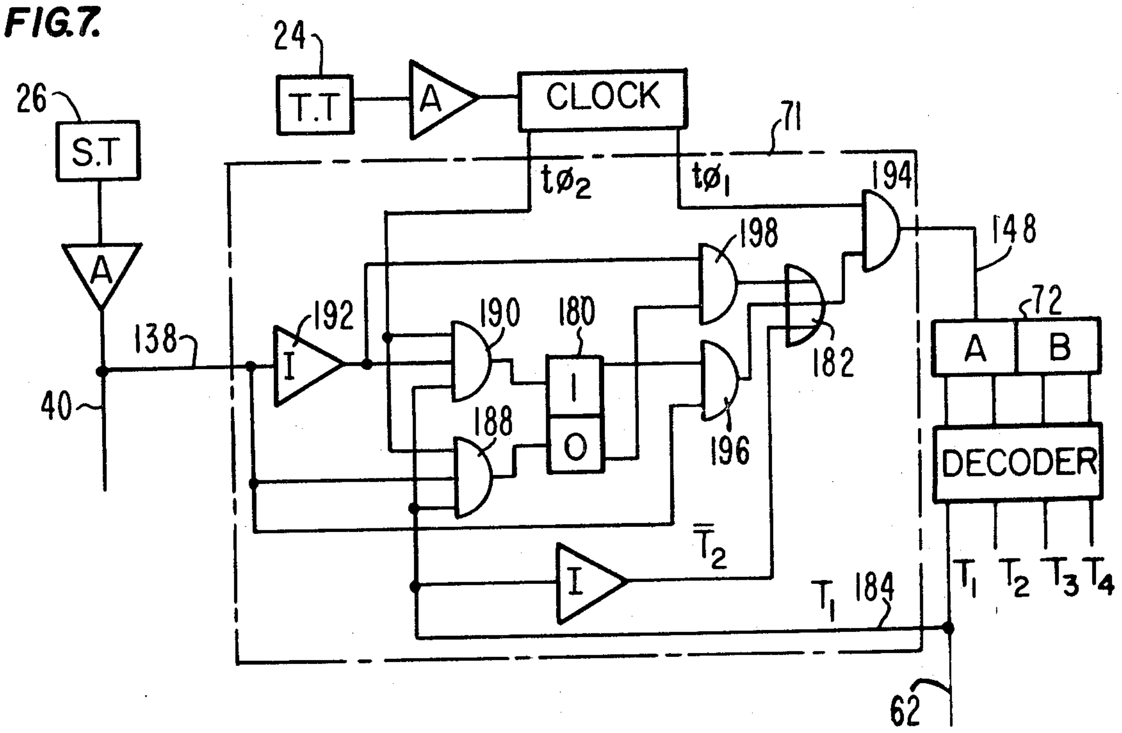
FIG. 7 illustrates a circuit similar in purpose to FIG. 6 but differing in details and in operation.

The synchronizing circuit of FIG. 7 is generally like that previously described in connection with FIG. 6, but as will be explained more fully hereinafter it is capable of correcting nonsynchronized operation within a shorter time and sometimes within a few bits of the start thereof. Although the circuit of FIG. 7 may have a few more components than that of FIG. 6, it eliminates the need of a special location on the sector track for bringing the system back into synchronization. The circuit of FIG. 7 includes a flip-flop 180 which when the system is properly synchronized functions generally like flip-flop 150 of the circuit of FIG. 6 but changing its state at every regularly spaced time interval $T_1$ and not at every other time interval $T_1$ as in the case of the circuit of FIG. 6. An OR-gate 182 corresponds in function to OR-gate 142 of FIG. 6. A branch line 184 introduces signals into the synchronizing circuit from the decoder 70 at time $T_1$ periods, and a branch line 186 introduces signals from the sector track into the circuit by way of channel 40. These sector track signals are fed to AND-gates 188 and 190, which function like AND-gates 152 and 160 of the previously described synchronizing circuit. An inverter 192 reverses the conditions of the signals to AND-gate 190 much as inverter 158 of FIG. 6 does. The output of the OR-gate 182 is delivered to an AND-gate 194 corresponding in function to AND-gate 142 of the circuit of FIG. 6. Like the latter circuit, timing phase signals $t0_1$ and $t0_2$ are introduced into the synchronizing circuit and connected to the inputs to AND-gates 194, 188, and 190.

The synchronizing circuit of FIG. 7 differs from that of FIG. 6 by an extension of channel 184 for delivering timing signals $T_1$to AND-gate 190 and by the provision of a pair of AND-gates 196 and 198 interposed between the flip-flop 180 and the OR gate 182. The AND-gate 196 has an input connected to the "one" side of the flip-flop 180 and another input which receives the code group signals from the sector track 26. The AND-gate 198 has one input connected to the "zero" side of flip-flop 180 and another input which receives the inverted code group signals from the sector track.

Because of the differences between the two synchronizing circuits of FIGS. 6 and 7, the latter is capable of storing the binary signal last received at time $T_1$ from the sector track and comparing the same with the currently received signal $T_1$. If the current signal $T_1$ is different from its previous state, the circuit will continue to operate the binary counter. On the other hand, if the current signal from the sector track at $T_1$ is the same value as that received at previous $T_1$ time interval, then the three inputs to the OR-gate 182 will be not true or low and AND-gate 194 will not be satisfied and the absence of an output therefrom will inhibit the counter 72 from operating. The stoppage of the counter 72 will last until a different signal is received at time $T_1$. In other words, differing from the operation of the circuit in FIG. 6, the presently described synchronizing circuit will almost immediately take steps to correct its nonsynchronized condition and can accomplish this correction within a few bits, in some cases, or after the reading of several code groups on the sector track. It will not be necessary, as in the case of the circuit of FIG. 6, to wait until a special location on the sector track is reached.

In normal synchronized operation of the circuit in FIG. 7, both AND-gates 188 and 190 receive $T_1$ timing signals at the time the first digit of the sector track code groups pass by the reading head 32. At such times the value of the first digit of these code groups, if prerecorded in the sector track in the manner such as described in connection with FIG. 2, will alternate between binary "one" and binary "zero." This will cause the flip-flop 180 to change its condition each time the leading digit of each code group is read. Between the times the flip-flop is changing state as the leading digit of each code group is sensed, all of the remaining digits in the sector track are serially sensed and their values are fed to AND-gates 196 and 198 (and to the latter in inverted form). The OR-gate 182 receives the output of these two AND-gates and the inverted timing signals at $T_1$ times and functions as did OR-gate 164 of FIG. 6 to provide an output to AND-gate 194 if any one of the signals received thereby is high or true. It will be apparent that if the circuit is in synchronism, then at either set or reset condition of the flip-flop one of the signals received by the OR-gate 182 will be true or high. The flip-flop will alternately provide a high positive signal to AND-gate 196 and a high negative signal to AND-gate 198 and their respective outputs will be received by the OR-gate 182 at the time the inverted timing signals at $T_1$ are received. In operation, the flip-flop will remember its last received signal, and in synchronous operation this will be the binary value of the last digit read from the sector track at time $T_1$.

Figure 8:
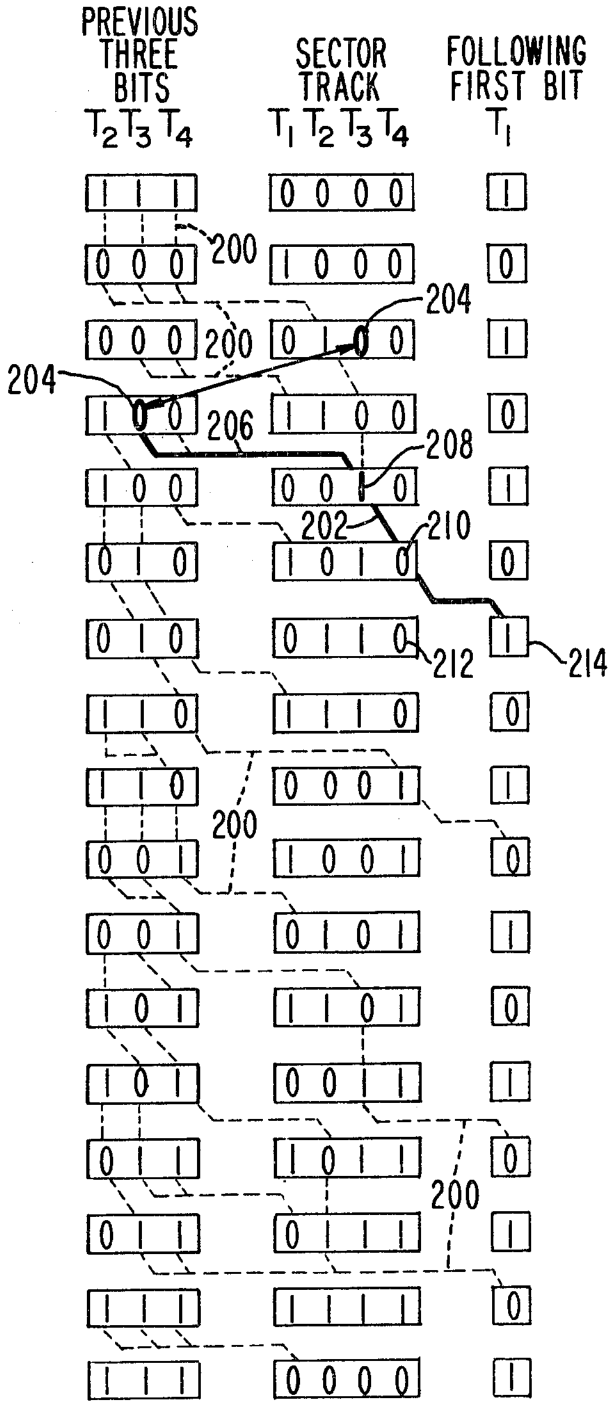
FIG. 8 is a chart of the sector track illustrating the steplike process performed by the circuit of FIG. 7 in bringing the system back into synchronization.

The chart of FIG. 8 may be helpful in explaining the self-correcting action of the circuit of FIG. 7. The middle column of the three illustrated in FIG. 8 displays the code groups of the sector track in the order they are presented in FIG. 2. The left column of the chart is a vertical listing of the three most significant digits of each code group in the sector track by displaced downwardly one level from its corresponding code group in the middle column. The right column is a vertical listing of the first or least significant digit of each code group in the sector track but displaced one step down from its corresponding code group shown in the middle column. In other words, at each horizontal level in the chart of FIG. 8 the middle column exhibits a given code group in the sector track, and shows in the left column on the same level the three most significant digits of the immediately preceding code group in the track, and in the right column on the same level the first or least significant digit of the next succeeding code group in the track. Having the sector track spread out, in this fashion, it is possible to show graphically how long it would take for each nonsynchronous operating circumstance to return to proper synchronous operation. Running through the chart of FIG. 8 are dotted lines indicated at 200 which represent various correction actions performed by the circuit of FIG. 7 in order to bring the counter 72 into synchronism with the reading of the digits from the sector track. The left column considers only the three digits of each code group which would normally be read at times $T_2$, $T_3$, and $T_4$. The dotted lines leading from each of the digits of this trio show how, if any one of these digits should be mistakenly read at time $T_1$, the counter is automatically corrected either within a few digits or a few code groups to proper synchronized operation.

As an example of one such self-correction, reference is made to the full line 202 traced through the columns of the chart in FIG. 8. It will be assumed that the counter falsely considers the third digit in the code group representing the binary number "2" to be read at time $T_1$ rather than at time $T_3$ as in normal operation. In order to more conveniently show how the counter's operation is self-corrected, this third digit which is identified at 204 is also shown as the middle digit in the left column but on the level of the next succeeding code group of the sector track. These identical digits are both emphasized in the chart and a connecting arrow symbolizes that these are the same digits although represented in different columns. Assuming now that as this third digit is read it is falsely considered by the counter to be the first digit of a code group at $T_1$ time, then four digits later at this false $T_1$ time a second reading of the corresponding third digit in the next code group will be made. In normal synchronized operation, this last digit would be a binary "one." Instead, in this nonsynchronous example, the digit directly below and in the next lower level of either the left or middle column is a "zero." Reading this "zero" at false $T_1$ time fails to change the condition of the flip-flop 180 thus causing all the inputs to the OR-gate 182 to be low or not true with the result that no output occurs therefrom to continue the operation of the counter. As a result, the counter's operation is inhibited for one bit.

The next succeeding bit read from the sector track and bypassed around the flip-flop 180 to the AND-gate 196 and 198 is also a "zero" and the counter is inhibited for a second bit time. This occurs for four bit times as represented by the full line portion 206 extending from the first column to the third digit position of the second column at 208. In other words, the counter is held from operation for four digits until a binary digit of opposite value is read from the sector track, at which time the condition of the flip-flop will change causing the counter to resume counting operations. At the end of four bits, or when the false $T_1$ time occurs again, the circuit ascertains that a "one," instead of a "zero," is in the same digit position of the next code group thus preventing the flip-flop from changing its state at this time and the count will be held for one bit until the next digit 210 is read. Finding this digit to be of the opposite sign, the circuit causes the counter to again resume counting for four digits until the false $T_1$ time again occurs. At this time, a "zero" 212 is read from the sector track inhibiting the count for a one bit time thus presenting the "one" character of the first digit 214 of the next code group reading. Since this digit is of the opposite value than that of digit 210, the counter will then again resume operation, and from that point on the binary values of the first digit of the code groups will alternate between one and zero thus assuring continued operation of the counter in proper synchronized relationship with the reading of the digits in each code group from the sector track.

Figure 9:
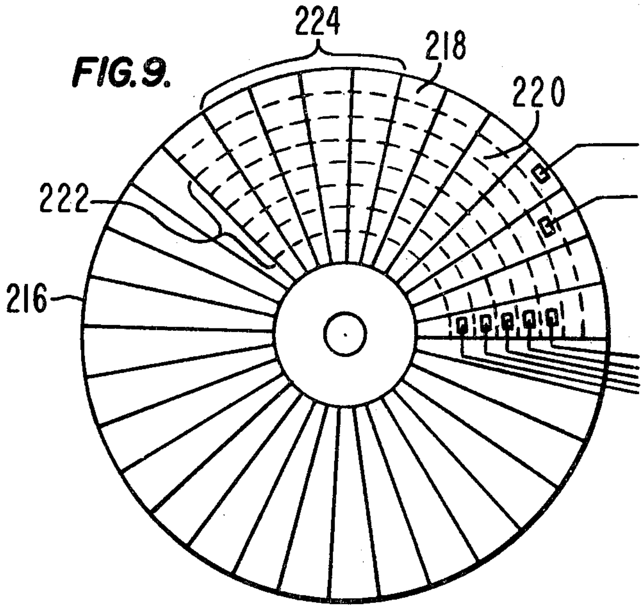
FIG. 9 is a schematic diagram of a magnetic disk file of larger capacity than hereinbefore described showing the organization of the word sections and tracks thereon.
Figure 11:
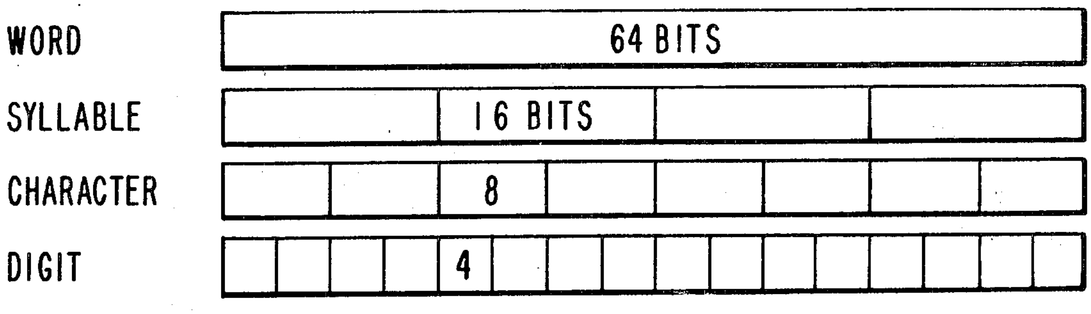
FIG. 11 is a diagram of one word along a track of the disk file of FIG. 9 showing the composite parts thereof.

The invention has hereinbefore been described with reference to a relatively small scale memory device employing a 64 bit disk, that is to say, there are a total of 64 bits in the various tracks around the disk. The invention is usable in larger scale addressing systems and FIGS. 9 to 13 are illustrative of a larger scale memory device having 2,144 bit cell locations on each of the tracks. In this larger data storage system, the memory consists of a ceramic disk 216 which may be 8 inches in diameter and coated with a material on which information is stored magnetically by electromagnetic transducing heads spaced approximately 0.001 inch from the disk. As in the previously described embodiment of the invention, the disk contains concentric clock and address tracks 218 and 220 respectively, and a plurality of data storage tracks 222 which, for the size of this disk, may consist of 30 or more tracks. For lack of space, considerably fewer number of such storage tracks are shown in FIG. 9.

Figure 12:
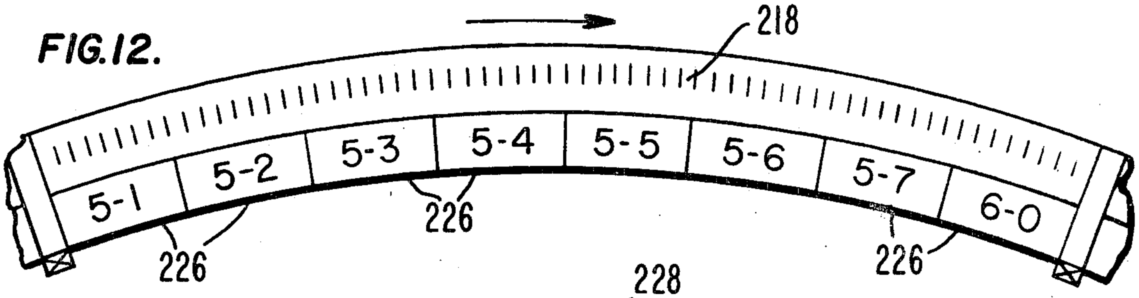
FIG. 12 illustrates a preferred form of layout of the timing and address tracks for the disk file of FIG. 9.

As illustrated in FIG. 9, the disk is divided into word sections, and in this instance 32 in all. A group of adjacent word sections makes up a sector of the disk, one of which is shown at 224 in FIG. 10. Each word section contains a word of 64 data bit locations and one parity bit and two guard bit locations. As set forth in FIG. 11, the 64 data bits of each word are divided into four syllables of 16 bits each, eight characters of eight bits each and 16 digits of four bits each. FIG. 12 illustrates one such word; namely, the fifth word and the division thereof into its eight characters of eight bits each. The parity and guard bit times appear at the end of each word and the information they contain may vary according to the address and contents of the word. A single magnetic head may be associated with each storage track 222 and employed for both reading and writing in its associated track. However, the heads associated with the storage tracks may be movable radially of the disk in order to write and read in different tracks.

The clock pulse track 218 and the sector pulse track 220 are preferably written on the disk at the time of its manufacture so that they cannot be altered. The clock track may consist of 2,144 bit cell locations of which 2,048 are addressable and so written that it has 4,288 magnetic polarity reversals. In other words, it is written symmetrically with a magnetic polarity reversal at the beginning and end of each cell time and precisely midway between the ends of the cell with the result that when read a sine wave is generated which as the wave goes into a positive region a square wave clock pulse is generated by the clock circuit and each time the wave enters the negative region a second square wave is generated. The result is that the clock track 218 is the source of two microsecond timing signal trains, the pulses of which occur alternately at microsecond intervals and provide the phase pulses $t0_1$ and $t0_2$ hereinbefore described.

The sector track 220 is one complete track of memory and in cooperation with a three-stage binary counter it is capable of addressing any digit location in any given track on the disk 216. The sector track is divided into 256 character increments, eight of which are shown at 226 in FIG. 12 for the word illustrated therein. Each character increment is made up of eight-bit cells preferably prerecorded in eight bit binary fashion to number each character position progressively from 000 to 255. Therefore, each group of eight bits in a character increment of track 220 contains a unique binary pattern corresponding to the count of the most significant eight bits of an 11-bit address. Preferably, although not necessarily, the placement of the sector track coding with respect to the storage tracks 222 may be such that the character "zero" precedes the character "zero" of the storage tracks by one character. This is evident from FIG. 12 where the code group for the first character of the sixth word, identified at 6–0, is in the last character position of the fifth word.

Figure 13:
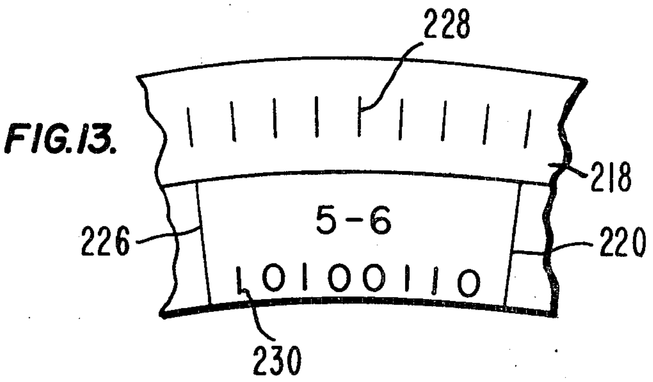
FIG. 13 is an enlargement of one character section of the disk layout in FIG. 10.
Figure 10:
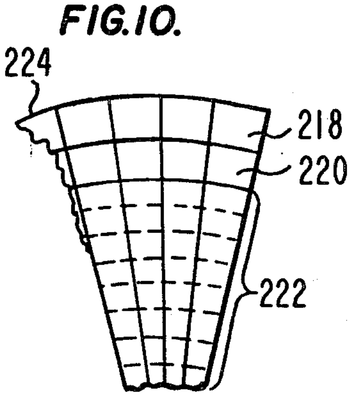
FIG. 10 is an enlarged view of one of the word sections of the disk file in FIG. 9.

FIG. 13 is an enlarged fragmentary portion of the disk's periphery schematically illustrating on an enlarged scale the timing track 218 and the sector track 220 and the relation of the bit cells exemplified at 228 to the binary code group 230 for the sixth character increment of the fifth word of the sector track. It is understood that when the information is stored magnetically, the markings appearing in the two tracks of FIGS. 12 and 13 are not actually visible to the eye as represented in the drawing. However, in an optical system employing this invention, it is likely that light-transmitting and opaque areas indicating the cell positions of the timing track and the binary notations of the sector track would be visible to the eye.

When incorporating the larger scale memory device of FIGS. 9 to 13 into a data storage addressing system embodying this invention, its greater number of storage locations requires the employment of a slightly larger binary counter. In this instance a three-stage counter in lieu of the two-stage counter described in connection with the system illustrated in FIG. 1. The three-stage counter counts the three least significant digits of an 11-digit address presented to this larger system, similarly to that described hereinbefore with reference to the two-stage counter 72. The three-stage counter would also keep track of the order of each digit being read serially from the sector track and to determine the beginning of the eight-digit code group or address in each character increment 226 of the sector track. The three-stage counter also gives the proper binary weight to each bit within a character increment.

In the memory device of FIGS. 9 to 13, there are 256 character increment or code groups per track, numbered 000 to 255, within each of which the eight bit times numbered 0 to 7 are given the following binary weights: 1, 2, 4, 8, 16, 32, 64 and 128 to identify any character code group 000 to 255 around the track. The last three bit times 5, 6 and 7 of each code group are also assigned binary weights of 1, 2 and 4 to identify any one of the eight sectors 224 of the disk and numbered 0 to 7. The third and forth bit times, 3 and 4, are also assigned binary weights of 1 and 2 to one of the four words 0 to 3 within a sector. The bit times 0, 1 and 2 of each character code group are used to identify a character 226 within a word. Bit times 3, 4, 5, 6 and 7 are also assigned binary weights of 1, 2, 4, 8 and 16 to identify a word, 0 to 31, within a storage track of the disk.

With these provisions, it is possible to make an absolute comparison of each digit in the character code group 226 as it is read from the rotating disk with the corresponding digit of the eight most significant digits of the address presented to the system and thus locate one out of 256 character increments in the disk, and to utilize the three-stage binary counter to compare the three least significant digits of the presented address and thus utilize the binary value determined by this count for locating the particular bit position which it represents within the located character increment of the disk. Expressed differently, it is possible with the hybrid combination of a binary counting technique and an absolute comparison technique for identifying and locating any bit time among the several thousands of bits around the disk or other cyclically movable storage member. Furthermore, certain properties of the code groups making up the sector track 220 may be utilized in the same manner as described in connection with the system in FIG. 1 for synchronizing the count of the three-stage binary counter with the reading of the bits in all character code groups.

Figure 14:
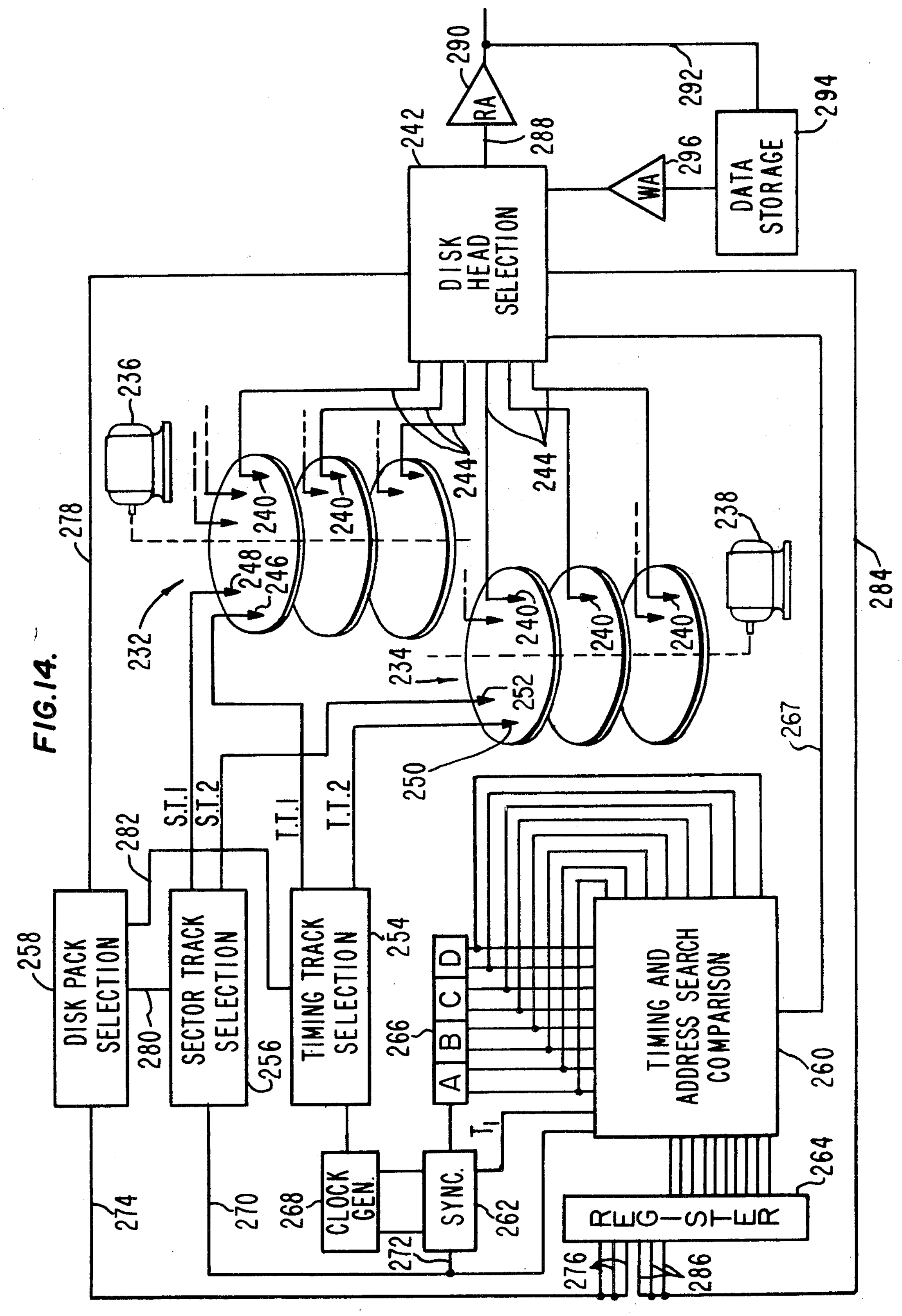
FIG. 14 illustrates a system composed of separate disk packs in which the invention is capable of synchronizing the transfer of information from one disk pack to another.

FIG. 14 illustrates the employment of the invention in a system having a still larger storage capacity and comprising a plurality of sets of disks, or disk packs as they are frequently referred to, into which information may be entered or extracted therefrom without concern about the problem of synchronization. The addressing technique of the present invention enables the equipment to locate any bit cell in any one data storage disk of one of several sets or packs of such disks and to self-synchronize the data transfer operation regardless of any difference in the rotating speeds of the disk packs.

Referring more particularly to FIG. 14, two sets or packs of magnetic storage disks are schematically illustrated at 232 and 234 to represent a larger number of such packs. The disks in each pack are mounted for joint rotation about a common axis and may be driven from separate sources of motor power as shown at 236 and 238 for rotating their respective disk packs at different speeds. All disks contain concentric data storage tracks with read/write magnetic transducers associated therewith such as exemplified at 240. A disk head selection provision is generally indicated at 242 and may be of conventional design for selecting any one magnetic heads 240 of any one of the disk packs for the purpose of transferring information along channels 244 for either entering information into or extracting information from the data storage tracks.

One disk of each pack carries a timing track and a sector track from which signals are picked up by magnetic read heads and utilized in the manner described hereinbefore for searching for an addressed storage location on a disk and for synchronizing the operation of information transferred into and out of the location. The timing and sector heads for the disk pack 232 are shown at 246 and 248 respectively. A similar pair of timing and sector heads for the second disk pack 234 are shown at 250 and 252 respectively. Signals from the timing tracks of these two sets of disks, and similarly from any other sets of disks which may be included in the system, are fed on channels identified at T.T.1 and T.T.2 to the timing track selection circuit, generally indicated at 254. Signals from the sector tracks of these two disk packs, and any additional disk packs in the system, are conveyed on channels identified at S.T.1 and S.T.2 to a sector track selection circuit generally indicated at 256. Associated with these two selection circuits is a disk pack selection control circuit 258 which determines the identity of the pack which will have information transferred thereinto or recovered therefrom, and depending upon which pack is selected it will activate the magnetic read transducers associated with the sector and timing tracks of that particular pack.

With the use of a multiple number of disk packs in the system of FIG. 14, it is possible to provide a large memory capacity up to $2^{20}$ bit per track with a four-stage binary counter. In employing the technique of this invention to a system of such a storage capacity, the sector track for each disk pack would be prerecorded with successive code groups each containing a number of bits of the address up to 16. A four-stage binary counter is used in the system to compare the four least significant bits of the address. The most significant bits of the address are used to select a particular track on one of the disks in one of the packs. The addressing technique and synchronization technique would be like that previously described and illustrated herein in connection with the system of FIG. 1. FIG. 14 discloses in general a block 260 containing the timing and address circuits, such as shown in FIG. 1, for locating the desired search area and a block 262 containing a synchronizing circuit, such as shown either in FIGS. 6 and 7, for assuring synchronization during the transfer of information. Associated with the circuitry contained within the block 260 is a register 264 into which the sought after address is stored for comparison purposes. As in FIG. 1, up to 16 bits stored in the register 264 would form one of two inputs to a similar number of AND-gates like those shown at 50, 52, 54, and 56 in FIG. 1.

The remaining four least significant bits of the address stored in the register would be compared to the count of a four-stage counter 266 similar, except in size, to the two-stage counter 72 of FIG. 1. The outputs from the counter 266 are similarly distributed to the circuitry of the addressing circuit in the manner described and illustrated in connection with FIG. 1. As in the operation of FIG. 1, when an exact comparison is obtained between a coded group on the sector track and the registered address, a signal would be conveyed from block 260 along channel 267 to the disk head selection circuit 242 to activate the head programmed for transferring information into or extracting information from the location signified by the address in the register.

As in FIG. 1, the timing track signals of whatever disk pack is selected are conveyed to a clock generator 268 where timing pulses $t0_1$ and $t0_2$ are generated and fed to the synchronizing circuit 262. Similarly, signals from the sector track are conveyed by channel 270 from the sector track selection circuit directly to the comparison circuit represented by clock 260 and also to the synchronizing circuit 262 as indicated by the branch line 272. It is evident that the components of the system of FIG. 14 are similar to those illustrated and described in connection with FIG. 1 and will function in the same fashion to make the address comparison and to synchronize the transfer operation.

In the operation of the system illustrated in FIG. 14, it is expected that whatever disk pack is selected by the selector 258 the binary counter 264 will not be in phase or synchronized with the reading of the code groups from the sector track. In other words, when selecting a particular disk pack, it is hardly likely that the binary counter will commence counting each code group at time $T_1$. Finding itself out of synchronization therewith, the synchronizing circuit 262 will function to bring the counter progressively into synchronization as the disks of the selected pack rotate. Either form the synchronizing circuit illustrated in FIG. 6 or 7 may be employed. The second circuit utilizing alternating "zeros" and "ones" at time $T_1$ is preferred because it commences its correction of nonsynchronization immediately after detection and completes its action within a short angular movement of the disk.

The selection of the disk pack may be controlled from a remote source of information or, as schematically shown, may be controlled from several of the bits of the address stored in the register 264. As illustrated in FIG. 14, a channel 274 extends from the register to the disk pack selection circuit 258 and has branch leads 276 separately sampling the digit locations of several of the most significant bits of the address stored in the register. This information will be conveyed by channel 278 from the disk pack selector 258 to the disk head selection circuit 242 to activate the circuits for selecting the wanted disk pack and at the same time by channels 280 and 282 to activate the sector and timing track read heads of the selected pack. Additionally, other bits of the address stored in the register 268 may be utilized to control the selection of the transducing head which is to be activated when comparison of the addresses occur. A channel 284 samples several of the bits of the address stored in the register as indicated by branch lines 286 and signals therefrom are conveyed to the disk head selection circuit 242 for this purpose.

The system of FIG. 14 provides an output indicated at 288 which may be amplified by read amplifier 290 and conveyed externally of the system for whatever use is made thereof. A feedback of this output is made on channel 292 to a data storage device 294. If wanted, this output information contained in the data storage 294 can be amplified by write amplifier 296 and reentered into the system for recording on another disk of a different disk pack under the control of the address and synchronization system previously described and illustrated herein.

While particular embodiments of the invention have been shown, it will be understood, of course, that it is not desired that the invention be limited thereto since modifications may be made, and it is, therefore, contemplated by the appended claims to cover any such modifications as fall within the true spirit and scope of the invention.

What is claimed is:

1. Data storage apparatus including, in combination,
   a memory surface movable along a prescribed path,
   an information track on said memory surface extending in the direction of movement thereof and having storage locations linearly spaced therealong for receiving and storing groups of binary digits each constituting a record of information,
   an address track on said memory surface extending in the direction of movement thereof and being divided linearly into prerecorded code groups each composed of binary digits, said code groups each individually identifying in binary notation the address of an individual one of said storage locations on the information track,
   an address register for storing in binary notation the digits of an address of a wanted storage location in said information track,
   first means operable as the memory surface moves for successively directly comparing the digits of each code group address on the address track with a part only of the address stored in the register, and
   second means operable in conjunction with said first means for performing a binary count of the digits in the remaining part of the address stored in the register.

2. The invention defined in claim 1 characterized in that the first means includes means for serially comparing each digit of each code group with each digit of the address stored in the register in the direction of the increasing significance of the digits.

3. The invention defined in claim 1 characterized in that the first mentioned part of the address stored in the register consists of its most significant digits, and that the said remaining part of the address stored in the register consists of its least significant digits.

4. The invention defined in claim 3 characterized in that the code groups of the address track contain an equal number of binary digits and progressively differ from one another by unity increments for substantially the full length of the track.

5. The invention defined in claim 4 characterized in that means is provided for successively sensing the presence of a common property of each code group as the memory surface moves along its prescribed path and for utilizing such sensed property for synchronizing the operation of the apparatus.

6. Data storage apparatus comprising, in combination, an information track having information storage locations linearly spaced therealong for storing and retrieving information in the form of groups of binary digits, an address track having prerecorded code groups linearly spaced therealong and each composed of an equal number of binary digits arranged in the order of increasing significance thereof an each code group identifying in binary notation the address of an individual one of said storage locations on the information track, means for presenting in binary notation the address of a wanted storage location on said information track, transducing means individually operatively associated with said tracks and operable upon relative movement of one with respect to the other in the direction of the tracks to read the address track and to effect transfer of information either into or from the information track, means operatively connected to the transducing means associated with the address track and operable as relative movement occurs therebetween for successively comparing each code group on the address track with the presented address, said last means including means for sequentially comparing each digit of each code group with each digit of the presented address in the order of the increasing significance of the digits, and means for producing a signal at the conclusion of such a sequential comparison signifying a complete match between all of the digits of one of the code groups and the digits of the presented address and rendering available the wanted storage location on the information track for information transfer.

7. The invention defined in claim 6 characterized in that information and address tracks are carried on a common cyclically movable member.

8. Data storage addressing apparatus comprising, in combination, a memory surface movable along a prescribed path and having storage locations linearly spaced therealong in the direction of movement thereof for receiving and storing information in the form of groups of binary digits, an address track extending in the direction of said prescribed path of movement of the memory surface and jointly movable therewith and being linearly divided into prerecorded code groups each composed of an equal number of binary digits, said code groups each signifying in binary notation the location of an individual one of said storage locations on the memory surface and progressively differing from one another by unity increments, means for presenting in binary notation the address of a wanted storage location on the memory surface, said presented address containing a greater number of digits than those of which the code groups are composed, means operable as the address track moves with the memory surface for serially sensing the digits of each code group on the address track and sequentially comparing the digits thereof with an equal number of digits of the presented address, and means operable in conjunction with said first means for performing a binary count of the remaining digits of the presented address in timed relation to the sensing of the digits of the code groups.

9. The invention defined in claim 8 characterized in that the digits of the code groups of the address track are sequentially compared against the more significant digits of the presented address and in that the binary count is made of the lesser significant digits of the presented address.

10. The invention defined in claim 8 characterized in that the code groups of the address track have a common digit position therein in which the binary value alternative in successive groups, and in that means is provided for sensing such alternation for determining if the binary counting means is properly synchronized with the operation of the apparatus.

11. Data storage addressing system comprising:

memory disk means rotatable about an axis, a plurality of information tracks on said disk means concentric with said axis and having storage locations linearly spaced therealong for receiving and storing groups of binary digits each constituting a record of information, an address track forming part of said disk means and concentric with said axis, said address track being divided into prerecorded code groups each composed of binary digits and each individually numerically identifying in binary notation the address of an individual one of said storage locations on the information tracks, a register for presenting in binary notation the address of a wanted storage location in one of said information tracks and containing a greater number of digits than those of which the code groups are composed, means operable as the disk means rotates for sensing the digits of each code group address on the address track and sequentially comparing the same with the more significant digits of the address presented by the register, means operable in conjunction with said first means for determining the numerical value of the lesser significant digits of the address presented by the register, said means including a binary counter having as many stages as the number of the remaining lesser significant digits of the presented address and counting the same in timed relation to the sensing of the digits in the address track, and means operatively associated with said comparing means for providing a signal making available the wanted storage location when a complete match occurs between one of said code groups and the more significant digits of the presented address and when the binary count of the lesser significant digits of the presented address has been concluded.

12. In a data storage addressing system:

a formatted memory disk rotatable about its axis, one or more information tracks carried by said disk concentric with its axis and each having data storage regions linearly spaced therealong for receiving and storing groups of binary digits constituting records of information, a circular prerecorded address track carried by said disk concentric with its axis and constituted by a single row of binary digits equally spaced apart from one another, said row of binary digits being divided into code groups each composed of an equal number of binary digits and each representing in binary notation the location of individual storage region in the information tracks, said code groups progressively differing from one another by unity increments throughout the extent of the address track and having their respective digits similarly arranged in a given direction of greater significance, an address register for presenting in binary notation the address of a particular digit position within a wanted storage region in the information tracks and containing a greater number of digits than those of which the code groups are composed, means operable as the disk rotates for sensing the digits of each code group on the address track and sequentially comparing the digits of the code groups against the more significant digits of the address presented by the register, means operable as the disk rotates for determining the numerical value of the remaining lesser significant digits of the address presented by the register, and means for combining the determined value of the lesser significant digits of the presented address with the address represented by the code group exactly matching the more significant digits of the presented address for locating the particular digit position within the wanted storage region of the information tracks.

13. A data storage disk rotatable about its axis, one or more circular information tracks carried on at least one of the opposite sides of said disk concentric with its axis and each having data storage regions circularly spaced therearound for receiving and storing groups of binary digits constituting records of information, a circular prerecorded address track carried on one side of said disk concentric with its axis and constituted by a single circular row of binary digits equally spaced apart from one another, said row of binary digits being divided into sectors each having a code pattern therein composed of an equal number of binary digits and each representing in binary notation the location of an individual storage region in the information tracks, and said code patterns differing from one another throughout the extent of the address track but having their respective binary digits similarly arranged in a given direction of greater significance.

14. The invention described in claim 13 characterized in that in a digit position common to all of the code patterns the binary value of the digit therein alternates in binary value throughout the succession of the code patterns around the address track.

15. A data storage addressing apparatus:

a disk rotatable about its axis carrying a concentric circular track of equally spaced apart binary digits and divided into sectors each containing a pattern of a like number of binary digits, said digit patterns numerically differing from one another and having their respective digits similarly arranged in a given direction of greater significance, means for presenting in binary notation a group of binary digits representing a numerical value and composed of a greater number of digits than those contained by said digit patterns, means operable as the disk rotates for sensing the digits of said track and sequentially comparing the digits of each pattern against the more significant digits of the presented group of digits and in the direction of their greater significance, means also operable as the disk rotates for determining the numerical value of the remaining lesser significant digits of the presented group of digits, and means for arithmetically combining the determined value of the lesser significant digits of the presented group of digits with the numerical value of the pattern of digits on the track exactly matching the more significant digits of the presented group of digits.

16. Data storage apparatus including:

a disk rotatable about its axis carrying a concentric circular track of equally spaced-apart binary digits and divided into sectors each containing a like number of binary digits but each presenting a pattern differing from all others, said track characterized in that in a digit position common to all of the code patterns the digit therein alternates in binary value throughout the succession of the patterns around the track, means operable as the disk rotates for sequentially sensing the digits of said track and providing a readout of each pattern, and means also operable as the disk rotates for timing the operation of the apparatus on the occurrence of the alternation of the binary value of the digits in said common digit position as successive patterns of the track are read out.

17. The invention defined in claim 16 characterized in that a counter is employed for counting the digits of each pattern as they are read out, and that means is provided which cooperates with said timing means for synchronizing the operation of the counter with the readout of each pattern.

18. The invention defined in claim 17 characterized in that means is provided for inhibiting the counting operation of the counter for a time sufficient to bring it into synchronization with the pattern readout in the event the counter is found to be out of synchronization therewith.

19. A data storage addressing system comprising:

a plurality of sets of disks each having their respective disks jointly rotatable about a common axis, means for driving the sets of disks at rotative speeds which may differ from one another, at least one disk in each set of disks containing concentric data storage tracks in which, with the aid of transducing means, information may be transferred either into or therefrom, at least one disk in each set of disks having a concentric address track for locating storage areas in the information tracks of its respective set, each said address track being formed of binary digits and divided into sectors each containing a code pattern of digits differing from the other code patterns in the track, each said address track being further characterized in that in a digit position common to all of the code patterns of the track the digit therein alternates in binary value throughout the succession of the code patterns around the track, means associated with each data storage track of each set of disks and operable as its respective set of disks rotates for transferring information either into or from its associated data storage track, means operatively associated with said last means for selecting a particular one of said sets of disks for transferring information either into or from the data storage tracks thereof, and means associated with each address track of each set of disks and operable when its associated set of disks is selected for information transfer to sequentially sense the digit in said common digit positions of its address track and to time the operation of any such information transfer with the alternation of the binary value thereof.

20. The method of addressing a cyclically movable data storage medium having data storage areas thereon which comprises:

prerecording on the medium an address track of binary digits extending in the direction of movement of the medium and composed of successive code groups each containing the address of a different one of the storage areas on the medium, presenting to the medium a data storage address composed of more binary digits than the digits in each code group of the address track on the medium, successively comparing the code groups on the address track as the medium is moved with the more significant digits of the presented address, and determining the specific location within the storage area wanted by the presented address by determining the value of the least significant digits of the presented address and combining it with the code group of the address track exactly matching the more significant digits of the presented address.

* * * * *

UNITED STATES PATENT OFFICE

CERTIFICATE OF CORRECTION

Patent No. 3,631,421 Dated December 28, 1971

Inventor(s) Cornelius C. Perkins

It is certified that error appears in the above-identified patent and that said Letters Patent are hereby corrected as shown below:

Column 4, line 42, "one sector track ahead" should read -- one sector ahead --. Column 6, line 46, "$tO_1$" should read -- $t\emptyset_1$ --; line 48, "$tO_2$" should read -- $t\emptyset_2$ --. Throughout the balance of the patent wherever "$tO_1$" and "$tO_2$" appear they should read -- $t\emptyset_1$ -- and -- $t\emptyset_2$ -- respectively. Column 7, line 6, "A, A, B, and B" should read -- $\overline{A}$, A, $\overline{B}$ and B --; line 25, "the direction comparison" should read -- the direct comparison --. Column 9, line 18, '"the"hgih"' should read -- the "high" --; line 55, "AND gate 12" should read -- AND gate 126 --. Column 15, line 49, "by displaced" should read -- but displaced --; lines 67 and 68, "various correction" should read -- various correcting --; Column 16, line 47, "group reading" should read -- group for reading --; line 49, "first digit" should read -- first digits --. Column 21, line 15, "an each" should read -- and each of --.

Signed and sealed this 8th day of August 1972.

(SEAL)
Attest:

EDWARD M. FLETCHER, JR.
Attesting Officer

ROBERT GOTTSCHALK
Commissioner of Patents